United States Patent
Reiser et al.

(10) Patent No.: US 12,492,250 B2
(45) Date of Patent: Dec. 9, 2025

(54) suPAR AND PREDICTION AND TREATMENT OF ACUTE KIDNEY INJURY

(71) Applicants: Jochen Reiser, Chicago, IL (US); Salim Hayek, Ann Arbor, MI (US); Arshed A. Quyyumi, Atlanta, GA (US)

(72) Inventors: Jochen Reiser, Chicago, IL (US); Salim Hayek, Ann Arbor, MI (US); Arshed A. Quyyumi, Atlanta, GA (US)

(73) Assignees: Emory University, Atlanta, GA (US); Rush University Medical Center, Chicago, IL (US)

( * ) Notice: Subject to any disclaimer, the term of this patent is extended or adjusted under 35 U.S.C. 154(b) by 1186 days.

(21) Appl. No.: 17/278,959

(22) PCT Filed: Sep. 30, 2019

(86) PCT No.: PCT/US2019/053802
§ 371 (c)(1),
(2) Date: Mar. 23, 2021

(87) PCT Pub. No.: WO2020/069498
PCT Pub. Date: Apr. 2, 2020

(65) Prior Publication Data
US 2022/0135669 A1    May 5, 2022

Related U.S. Application Data

(60) Provisional application No. 62/738,403, filed on Sep. 28, 2018.

(51) Int. Cl.
| | | |
|---|---|---|
| C07K 16/28 | (2006.01) | |
| A61P 13/12 | (2006.01) | |
| C07K 14/705 | (2006.01) | |
| G01N 33/68 | (2006.01) | |

(52) U.S. Cl.
CPC .......... *C07K 16/28* (2013.01); *A61P 13/12* (2018.01); *C07K 14/705* (2013.01); *G01N 33/6803* (2013.01); *C07K 2317/24* (2013.01)

(58) Field of Classification Search
CPC ......... G01N 33/57438; G01N 33/6803; G01N 2333/70596; G01N 2800/347; C07K 16/28; C12Y 304/21073
See application file for complete search history.

(56) References Cited

U.S. PATENT DOCUMENTS

| | | | |
|---|---|---|---|
| 4,522,811 A | 6/1985 | Eppstein et al. | |
| 4,526,938 A | 7/1985 | Churchill et al. | |
| 4,880,078 A | 11/1989 | Inoue et al. | |
| 5,128,326 A | 7/1992 | Balazs et al. | |
| 5,290,540 A | 3/1994 | Prince et al. | |
| 5,374,548 A | 12/1994 | Caras | |
| 5,399,331 A | 3/1995 | Loughrey et al. | |
| 5,416,016 A | 5/1995 | Low et al. | |
| 5,641,870 A | 6/1997 | Rinderknecht et al. | |
| 5,679,377 A | 10/1997 | Bernstein et al. | |
| 5,855,913 A | 1/1999 | Hanes et al. | |
| 5,874,064 A | 2/1999 | Edwards et al. | |
| 5,912,015 A | 6/1999 | Bernstein et al. | |
| 5,916,597 A | 6/1999 | Lee et al. | |
| 5,934,272 A | 8/1999 | Lloyd et al. | |
| 5,985,309 A | 11/1999 | Edwards et al. | |
| 5,985,320 A | 11/1999 | Edwards et al. | |
| 5,989,463 A | 11/1999 | Tracy et al. | |
| 6,019,968 A | 2/2000 | Platz et al. | |
| 6,316,024 B1 | 11/2001 | Allen et al. | |
| 6,350,466 B1 | 2/2002 | Li et al. | |
| 8,101,726 B2 | 1/2012 | Parry | |
| 2011/0212083 A1 | 9/2011 | Reiser | |
| 2014/0083945 A1 | 3/2014 | Reiser | |
| 2014/0302065 A1 | 10/2014 | Fornoni et al. | |
| 2017/0016070 A1 | 1/2017 | Oberbauer et al. | |
| 2018/0252705 A1 | 9/2018 | Reiser et al. | |

FOREIGN PATENT DOCUMENTS

| | | |
|---|---|---|
| EP | 1365797 B1 | 1/2002 |
| WO | 91005548 A1 | 5/1991 |
| WO | 92019244 A2 | 11/1992 |
| WO | 96020698 A2 | 7/1996 |
| WO | 97032572 A2 | 9/1997 |

(Continued)

OTHER PUBLICATIONS

Vajdos et al. Comprehensive Functional Maps of the Antigenbinding Site of an Anti-ErbB2 Antibody Obtained with Shotgun Scanning Mutagenesis. J Mol Biol. Jul. 5, 2002;320(2):415-28 (Year: 2002).*

Brown et al. Tolerance to Single, but Not Multiple, Amino Acid Replacements in Antibody VH CDR2. J Immunol. May 1996;156(9):3285-91 (Year: 1996).*

Aagaard et al. RNAi therapeutics: Principles, prospects and challenges. Advanced Drug Delivery Reviews 59 (2007) 75-86 (Year: 2007).*

Warzocha et al. Antisense Strategy: Biological Utility and Prospects in the Treatment of Hematological Malignancies. Leukemia and Lymphoma, vol. 24. pp. 267-281 (Year: 1997).*

Guido et al. Virtual Screening and Its Integration with Modern Drug Design Technologies. Curr Med Chem. 2008; 15(1):37-46 (Year: 2008).*

(Continued)

*Primary Examiner* — Vanessa L. Ford
*Assistant Examiner* — Sandra Carter
(74) *Attorney, Agent, or Firm* — Emory Patent Group

(57) ABSTRACT

Methods and compositions for treating acute kidney injury in a subject are provided. The methods include measuring or having measured a level of soluble urokinase plasminogen activator receptor (suPAR) in a biological sample from the subject, determining or having determined the level of suPAR in the sample compared to a control suPAR level, and administering a therapeutically effective amount of an agent that antagonizes soluble urokinase plasminogen activator receptor (suPAR) to the subject having an elevated level of suPAR relative to the control suPAR level.

9 Claims, 14 Drawing Sheets

(56) References Cited

FOREIGN PATENT DOCUMENTS

| WO | 97044013 A1 | 11/1997 | |
|---|---|---|---|
| WO | 98031346 A1 | 7/1998 | |
| WO | 99015154 A1 | 4/1999 | |
| WO | 99020253 A1 | 4/1999 | |
| WO | 99066903 A2 | 12/1999 | |
| WO | 2002058714 A2 | 8/2002 | |
| WO | 2005116077 A2 | 12/2005 | |
| WO | 17040488 A1 | 3/2017 | |
| WO | 17053976 A1 | 3/2017 | |
| WO | WO-2017053976 A1 * | 3/2017 | ....... C07K 14/70596 |
| WO | 17072252 A1 | 5/2017 | |

OTHER PUBLICATIONS

Clark et al. Discovery and Development of Janus Kinase (JAK) Inhibitors for Inflammatory Diseases. J. Med. Chem., 2014, 57 (12), pp. 5023-5038 (Year: 2014).*

Nusshag et al. Infection (2019) 47 (Suppl 1):S1-S67 (Year: 2019).*

Mossanen et al. Elevated Soluble Urokinase Plasminogen Activator Receptor and Proenkephalin Serum Levels Predict the Development of Acute Kidney Injury after Cardiac Surgery. Int. J. Mol. Sci. 2017, 18, 1662 (Year: 2017).*

Khwaja A. KDIGO clinical practice guidelines for acute kidney injury. Nephron Clin Pract 2012;120:c179-84.

Killion et al., "Systemic Targeting of Liposome-Encapsulated Immunomodulators to Macrophages for Treatmentof Cancer Metastasis," Immunomethods (1994) 4:273.

Kim GS, Ko YG, Shin DH, Kim JS, Kim BK, Choi D, Hong MK and Jang Y. Elevated serum cystatin C level is an Independent predictor of contrast-induced nephropathy and adverse outcomes in patients with peripheral artery disease undergoing endovascular therapy. J Vasc Surg. 2015;61:1223-30.

Kiss N, Hamar P. Histopathological Evaluation of Contrast-Induced Acute Kidney Injury Rodent Models. Biomed Res Int 2016;2016:3763250.

Knappik et al., "Fully Synthetic Human Combinatorial Antibody Libraries (HuCAL) based on Modular Consensus Frameworks and CRDRs Randomized with Trinucleotides," J Mol Biol (2000) 296:57-86.

Ko YA, Hayek S, Sandesara P, Samman Tahhan A, Quyyumi A. Cohort profile: the Emory Cardiovascular Biobank (EmCAB). BMJ Open 2017;7:e018753.

Koch A, Voigt S, Kruschinski C, Sanson E, Duckers H, Horn A, Yagmur E, Zimmermann H, Trautwein C and Tacke F. Circulating soluble urokinase plasminogen activator receptor is stably elevated during the first week of treatment in the Intensive care unit and predicts mortality in critically ill patients. Crit Care. 2011; 15:R63.

Koller L, Stojkovic S, Richter B, Sulzgruber P, Potolidis C, Liebhart F, Mortl D, Berger R, Goliasch G, Wojta J, Hulsmann M and Niessner A. Soluble Urokinase-Type Plasminogen Activator Receptor Improves Risk Prediction in Patients With Chronic Heart Failure. JACC Heart Fail. 2017;5:268-277.

Lam et al., (1997) Proc. Int'l Symp Control Rel Bioact. Mater 24:759-760.

Lameire NH, Bagga A, Cruz D, et al. Acute kidney injury: an increasing global concern. Lancet 2013;382:170-9.

Langer (1982) Chem Tech 12:98-105.

Langer "New Methods of Drug Delivery," Science (1990) 249:1527-1533.

Langer et al., "Biocompatibility of Polymeric Delivery Systems for Macromolecules," J. Biomed Mater. Res (1981) 15:167-277.

Lau A, Chung H, Komada T, et al. Renal immune surveillance and dipeptidase-1 contribute to contrast-induced acute kidney injury. J Clin Invest 2018;128:2894-913.

Lautin EM, Freeman NJ, Schoenfeld AH, Bakal CW, Haramati N, Friedman AC, Lautin JL, Braha S, Kadish EG, Sprayregen S and et al. Radiocontrast-associated renal dysfunction: incidence and risk factors. AJR Am J Roentgenol. 1991;157:49-58.

Leth JM, Leth-Espensen KZ, Kristensen KK, et al. Evolution and Medical Significance of LU Domain-Containing Proteins. Int J Mol Sci 2019;20.

Levey AS, Stevens LA, Schmid CH, et al. A new equation to estimate glomerular filtration rate. Ann Intern Med 2009; 150:604-12.

Levy et al., "Inhibition of Calcification of Bioprosthetic Heart Valves by Local Controlled-Release Diphosphonate," Science (1985) 228:190.

Li PK, Burdmann EA, Mehta RL, Joint International Society of N, International Federation of Kidney Foundations World Kidney Day Steering C. Acute kidney injury: Acute kidney injury—global health alert. Nat Rev Nephrol 2013;9:133-5.

Li S, Tang X, Peng L, Luo Y, Zhao Y, Chen L, Dong R, Zhu J, Chen Y and Liu J. A head-to-head comparison of homocysteine and cystatin C as pre-procedure predictors for contrast-induced nephropathy in patients undergoing coronary computed tomography angiography. Clin Chim Acta. 2015;444:86-91.

Lichosik M, Jung A, Jobs K, Mierzejewska A, Zdanowski R and Kalicki B. Interleukin 18 and neutrophil-gelatinase associated lipocalin in assessment of the risk of contrast-induced nephropathy in children. Cent Eur J Immunol. 2015;40:447-53.

Ling W, Zhaohui N, Ben H, Leyi G, Jianping L, Huili D and Jiaqi Q. Urinary IL-18 and NGAL as early predictive biomarkers in contrast-induced nephropathy after coronary angiography. Nephron Clin Pract. 2008; 108:c176-81.

Lipsky et al., "Infliximab and Methotrexate in the Treatment of Rheumatoid Arthritis," New Engl. J. Med (2000) 343:1594-1602.

Liu et al., "Randomised, Double Blind, Placebo Controlled Study of Interferon beta-1a in relapsin-Remitting Multiple Sclerosis Analysed by Area Under Disability/Time Curves," J. Neurol Neurosurg Psych, (1999) 67:451-456.

Luo S, Coresh J, Tin A, et al. Soluble Urokinase-Type Plasminogen Activator Receptor in Black Americans with CKD. Clinical journal of the American Society of Nephrology : CJASN 2018;13:1013-21.

Maile LA, Busby WH, Gollahon KA, et al. Blocking ligand occupancy of the alphaVbeta3 integrin inhibits the development of nephropathy in diabetic pigs. Endocrinology 2014;155:4665-75.

McCullough PA, Choi JP, Feghali GA, et al. Contrast-Induced Acute Kidney Injury. J Am Coll Cardiol 2016;68:1465-73.

Mehran R, Aymong ED, Nikolsky E, Lasic Z, Iakovou I, Fahy M, Mintz GS, Lansky AJ, Moses JW, Stone GW, Leon MB and Dangas G. A simple risk score for prediction of contrast-induced nephropathy after percutaneous coronary Intervention: development and initial validation. J Am Coll Cardiol. 2004;44:1393-9.

Milgrom et al., "Treatment of Allergic Asthma with Monoclonal Anti-IgE Antibody," New Engl. J. Med (1999) 341:1966-1973.

Mishra J, Ma Q, Prada A, Mitsnefes M, Zahedi K, Yang J, Barasch J and Devarajan P. Identification of neutrophil gelatinase-associated lipocalin as a novel early urinary biomarker for ischemic renal injury. J Am Soc Nephrol. 2003;14:2534-43.

Mitchell AM, Jones AE, Tumlin JA and Kline JA. Incidence of contrast-induced nephropathy after contrast-enhanced computed tomography in the outpatient setting. Clin J Am Soc Nephrol. 2010;5:4-9.

Mookerjee SA, Nicholls DG, Brand MD. Determining Maximum Glycolytic Capacity Using Extracellular Flux Measurements. PLOS One 2016;11:e0152016.

Mori K, Lee HT, Rapoport D, Drexler IR, Foster K, Yang J, Schmidt-Ott KM, Chen X, Li JY, Weiss S, Mishra J, Cheema FH, Markowitz G, Suganami T, Sawai K, Mukoyama M, Kunis C, D'Agati V, Devarajan P and Barasch J. Endocytic delivery of lipocalin-siderophore-iron complex rescues the kidney from ischemia-reperfusion injury. J Clin Invest. 2005;115:610-21.

Mossanen JC, Pracht J, Jansen TU, et al. Elevated Soluble Urokinase Plasminogen Activator Receptor and Proenkephalin Serum Levels Predict the Development of Acute Kidney Injury after Cardiac Surgery. Int J Mol Sci 2017;18.

Mueller C, Buerkle G, Buettner HJ, Petersen J, Perruchoud AP, Eriksson U, Marsch S and Roskamm H. Prevention of contrast media-associated nephropathy: randomized comparison of 2 hydration regimens in 1620 patients undergoing coronary angioplasty. Arch Intern Med. 2002;162:329-36.

(56) References Cited

OTHER PUBLICATIONS

Muratoglu M, Kavalci C, Kilicli E, Findik M, Kayipmaz AE and Durukan P. Serum Neutrophil Gelatinase-Associated Lipocalin Levels in Early Detection of Contrast-Induced Nephropathy. Clin Invest Med. 2016;39:E88-94.
Ning et al., "Intratumoral Radioimmunotherapy of a Human Colon Cancer Xenograft Using a Sustained-Release Gel," Radiotherapy & Oncology (1996) 39:179-189.
O'Neal JB, Shaw AD, Billings FTt. Acute kidney injury following cardiac surgery: current understanding and future directions. Crit Care 2016;20:187.
Owais et al. "Chloroquine Encapsulated in Malaria-Infected Erythrocyte-Specific Antibody-Bearing Liposomes Effectively Controls Chloroquine-Resistant Plasmodium berghei Infections in Mice," Antimicrob Agents Chemother (1995) 39:180.
Padhy M, Kaushik S, Girish MP, Mohapatra S, Shah S and Koner BC. Serum neutrophil gelatinase associated lipocalin (NGAL) and cystatin C as early predictors of contrast-induced acute kidney injury in patients undergoing percutaneous coronary intervention. Clin Chim Acta. 2014;435:48-52.
Pakula AM, Skinner RA. Acute Kidney Injury in the Critically Ill Patient: A Current Review of the Literature. J Intensive Care Med 2016;31:319-24.
Persson PB, Hansell P and Liss P. Pathophysiology of contrast medium-induced nephropathy. Kidney Int. 2005;68:14-22.
Portielje et al., "IL-12: A Promising Adjuvant for Cancer Vaccination," Cancer Immunol Immunother (2003) 52:133-144.
Pozzoli S, Simonini M, Manunta P. Predicting acute kidney injury: current status and future challenges. J Nephrol 2018;31:209-23.
Rabb H, Griffin MD, Mckay DB, et al. Inflammation in AKI: Current Understanding, Key Questions, and Knowledge Gaps. J Am Soc Nephrol 2016;27:371-9.
Ranade "Drug Delivery Systems. 1. Site-Specific Drug Delivery using Liposomes as Carriers," J. Clin Pharmacol (1989) 29:685.
Ranger and Peppas (1983) J. Macromol Sci Rev Macromol. Chem 23:61.
Rear R, Bell RM, Hausenloy DJ. Contrast-induced nephropathy following angiography and cardiac interventions. Heart 2016;102:638-48.
Rewa O, Bagshaw SM. Acute kidney injury-epidemiology, outcomes and economics. Nat Rev Nephrol 2014;10:193-207.
Rihal CS, Textor SC, Grill DE, Berger PB, Ting HH, Best PJ, Singh M, Bell MR, Barsness GW, Mathew V, Garratt KN and Holmes DR, Jr. Incidence and prognostic importance of acute renal failure after percutaneous coronary Intervention. Circulation. 2002; 105:2259-64.
Agmon Y, Peleg H, Greenfeld Z, Rosen S and Brezis M. Nitric oxide and prostanoids protect the renal outer medulla from radiocontrast toxicity in the rat. J Clin Invest. 1994;94:1069-75.
Al-Beladi FI. Cystatin C is an early marker of contrast-induced nephropathy in patients with sepsis in the intensive care unit. Saudi J Kidney Dis Transpl. 2015;26:718-24.
Alharazy SM, Kong N, Saidin R, Gafor AH, Maskon O, Mohd M and Zakaria SZ. Serum neutrophil gelatinase-associated lipocalin and cystatin C are early biomarkers of contrast-induced nephropathy after coronary angiography in patients with chronic kidney disease. Angiology. 2014;65:436-42.
Al-Lazikani et al., "Standard Conformations for the Canonical Structures of Immunoglobulins," J Mol Bio (1997) 273:927-948.
Asciutto G, Edsfeldt A, Dias NV, Nilsson J, Prehn C, Adamski J and Goncalves I. Treatment with beta-blockers is associated with lower levels of Lp-PLA2 and suPAR in carotid plaques. Cardiovasc Pathol. 2013;22:438-43.
Bachorzewska-Gajewska H, Malyszko J, Sitniewska E, Malyszko JS, Pawlak K, Mysliwiec M, Lawnicki S, Szmitkowski M and Dobrzycki S. Could neutrophil-gelatinase-associated lipocalin and cystatin C predict the development of contrast-induced nephropathy after percutaneous coronary interventions in patients with stable angina and normal serum creatinine values? Kidney Blood Press Res. 2007;30:408-15.

Bachorzewska-Gajewska H, Poniatowski B and Dobrzycki S. Ngal (neutrophil gelatinase-associated lipocalin) and L-FABP after percutaneous coronary interventions due to unstable angina in patients with normal serum creatinine. Adv Med Sci. 2009;54:221-4.
Baert et al., "Influence of Immunogenicity on the Long-Term Efficacy of Infliximab in Chrohn's Disease," New Engl. J. Med (2003) 348:601-608.
Beniaminovitz et al. "Prevention of Rejection in Cardiac Transplantation by Blockade of the Interleukin-2 Receptor with a Monoclonal Antibody," New Engl. J. Med, (2000), 342: 613-619.
Bird et al., (1988) "Single-Chain Antigen-Binding Proteins," Science, (1988), 242:423-426.
Bloeman et al., "Adhesion Molecules" A New Target for Immunoliposome-Mediated Drug Delivery, FEBS Lett (1995) 357:140.
Briscoe et al., "Delivery of Superoxide Dismutase to Pulmonary Epithelium via pH-Sensitive Liposomes," Am. J. Physiol (1995) 1233:134.
Buchwald et al., "Long-Term, Continuous Intrvenous Heparin Administration by an Implantable Infusion Pump in Ambulatory Patients with Recurrent Venous Thrombosis," (1980) Surgery 88:507.
Cecchi E, Avveduto G, D'Alfonso MG, Terreni A, Gelera E, Caldini A and Giglioli C. Cystatin C, but not urinary or serum NGAL, may be associated with contrast induced nephropathy after percutaneous coronary invasive procedures: A single center experience on a limited No. of patients. Acta Med Acad. 2017;46:34-43.
Chen JS, Chang LC, Wu CZ, Tseng TL, Lin JA, Lin YF and Cheng CW. Significance of the urokinase-type plasminogen activator and its receptor in the progression of focal segmental glomerulosclerosis in clinical and mouse models. J Biomed Sci. 2016;23:24.
Chothia et al., "Canonical Structures for the Hypervariable Regions of Immunooglobulins," J. Mol Biol (1987) 196:901-917.
Chothia et al., "Conformations of Immunoglobulin Hypervariable Regions," Nature (1989) 342:877-883.
Cleek et al., "Biodegradable Polymeric Carriers for a bFGF Antibody of Cardiovascular Application," Pro. Int'l Symp Control Rel Bioact Mater (1997) 24:853-854.
Keinanen et al., "Biosynthetic Lipid-Tagging of Antibodies," FEBS Lett (1994) 346:123.
Dal Monte M, Cammalleri M, Pecci V, et al. Inhibiting the urokinase-type plasminogen activator receptor system recovers STZ-induced diabetic nephropathy. J Cell Mol Med 2019;23:1034-49.
Delville et al., "A Circulating Antibody Panel for Pretransplant Prediction of FSGS Recurrence after Kidney Transplantation," Science Translational Medicine, vol. 6, Issue 256, (2014), pp. 1-26.
During et al., "Controlled Release of Dopamine from a Polymeric Brain Implant: In Vivo Characterization," Ann. Neurol (1989) 25:351.
Eapen DJ, Manocha P, Patel RS, Hammadah M, Veledar E, Wassel C, Nanjundappa RA, Sikora S, Malayter D, Wilson PW, Sperling L, Quyyumi AA and Epstein SE. Aggregate risk score based on markers of inflammation, cell stress, and coagulation is an independent predictor of adverse cardiovascular outcomes. J Am Coll Cardiol. 2013;62:329-37.
Ebru AE, Kilic A, Korkmaz FS, Seker R, Sasmaz H, Demirtas S and Biyikli Z. Is cystatin-C superior to creatinine in the early diagnosis of contrast-induced nephropathy?: a potential new biomarker for an old complication. J Postgrad Med. 2014;60:135-40.
Epstein et al., (1985) PNAS 82:3688-3692.
Gaggin HK, Bhardwaj A, Belcher AM, et al. Design, methods, baseline characteristics and interim results of the Catheter Sampled Blood Archive in Cardiovascular Diseases (CASABLANCA) study. IJC Metabolic & Endocrine 2014;5:11-8.
Garg AX, Devereaux PJ, Yusuf S, et al. Kidney function after off-pump or on-pump coronary artery bypass graft surgery: a randomized clinical trial. JAMA 2014;311:2191-8.
Ghosh et al., "Natalizumab for Active Chrohn's Disease," New Engl. J. Med (2003) 348: 24-35.
Gruberg L, Mintz GS, Mehran R, Gangas G, Lansky AJ, Kent KM, Pichard AD, Satler LF and Leon MB. The prognostic Implications of further renal function deterioration within 48 h of interventional coronary procedures in patients with pre-existent chronic renal insufficiency. J Am Coll Cardiol. 2000;36:1542-8.

(56) References Cited

OTHER PUBLICATIONS

Hahm E, Wei C, Fernandez I, et al. Bone marrow-derived immature myeloid cells are a main source of circulating suPAR contributing to proteinuric kidney disease. Nat Med 2017;23:100-6.
Han R, Hu S, Qin W, et al. C3a and suPAR drive versican V1 expression in tubular cells of focal segmental glomerulosclerosis. JCI Insight 2019;4.
Hayek SS, Ko YA, Awad M, et al. Cardiovascular Disease Biomarkers and suPAR in Predicting Decline in Renal Function: A Prospective Cohort Study. Kidney Int Rep 2017;2:425-32.
Hayek SS, Koh KH, Grams ME, et al. A tripartite complex of suPAR, APOL1 risk variants and alphavbeta3 integrin on bodocytes mediates chronic kidney disease. Nat Med 2017;23:945-53.
Hayek SS, Landsittel DP, Wei C, et al. Soluble Urokinase Plasminogen Activator Receptor and Decline in Kidney Function in Autosomal Dominant Polycystic Kidney Disease. J Am Soc Nephrol 2019;30:1305-13.
Hayek SS, Sever S, Ko YA, et al. Soluble Urokinase Receptor and Chronic Kidney Disease. N Engl J Med 2015;373:1916-25.
Terold et al., "Anti-CD3 Monoclonal Antibody in New-Onset Type 1 Diabetes Mellitus," New Engl. J. Med (2002) 346:1692-1698.
Heyman SN, Rosenberger C and Rosen S. Regional alterations in renal haemodynamics and oxygenation: a role in contrast medium-induced nephropathy. Nephrol Dial Transplant. 2005;20 Suppl 1:16-11.
Hollinger and Hudson (2005) Nature Biotechnology 23:1126-1136.
Hou SH, Bushinsky DA, Wish JB, Cohen JJ and Harrington JT. Hospital-acquired renal insufficiency: a prospective study. Am J Med. 1983;74:243-8.
Howard et al., "Intracerebral Drug Delivery in Rats with Lesion-Induced Memory Deficits," J. Neurosurg (1989) 71:105.
Tuai Q, Mazar AP, Kuo A, et al. Structure of human urokinase plasminogen activator in complex with its receptor. Science 2006;311:656-9.
Huston et al., "Protein Engineering of Antibody Binding Sites: Recovery of Specific Activity in an Anti-Digoxin Single-Chain Fv Analogue Produced in Escherichia coli," PNAS (1988) 85:5879-5883.
Hwang et al., "Hepatic Uptake and Degradation of Unilamellar Sphingomyelin/Cholesterol Liposomes: A Kinetic Study," PNAS (1980) 77:4030-4034.
International Search Report, issued in PCT/US2019/053802, dated Dec. 18, 2019.
Jacob KA, Leaf DE, Dieleman JM, et al. Intraoperative High-Dose Dexamethasone and Severe AKI after Cardiac Surgery. J Am Soc Nephrol 2015;26:2947-51.
Jannot AS, Burgun A, Thervet E and Pallet N. The Diagnosis-Wide Landscape of Hospital-Acquired AKI. Clin J Am Soc Nephrol. 2017;12:874-884.
Jeppesen J, Hansen TW, Olsen MH, Rasmussen S, Ibsen H, Torp-Pedersen C, Hildebrandt PR and Madsbad S. C-reactive protein, insulin resistance and risk of cardiovascular disease: a population-based study. Eur J Cardiovasc Prev Rehabil. 2008;15:594-8.
Karlsberg RP, Dohad SY, Sheng R Iodixanol Peripheral CTASIP. Contrast-induced acute kidney injury (CI-AKI) following intra-arterial administration of iodinated contrast media. J Nephrol. 2010;23:658-66.
Kauffman ME, Kauffman MK, Traore K, et al. MitoSOX-Based Flow Cytometry for Detecting Mitochondrial ROS. React Oxyg Species (Apex) 2016;2:361-70.
International Preliminary Report on Patentability, issued in PCT/US2019/053802, dated Mar. 23, 2021.
Supplementary European Search Report, issued for EP Application 19866198.5, dated Jun. 21, 2022.
Huang, Jing et al., "Urinary Soluble Urokinase Receptor Levels are Elevated and Pathogenic in Patients with Primary Focal Segmental Glomerulosclerosis", BMC Medicine, Biomed Central Ltd, London, GB, May 20, 2014, vol. 12, No. 1.
Hayek et al. Soluble Urokinase Receptor and Chronic Kidney Disease, N Engl J Med 2015;373:1916-25.
Hayek et al. Soluble Urokinase Receptor and Acute Kidney Injury, N Engl J Med 2020;382:416-26.
Hayek et al. Assay-related Differences in SuPAR Levels: Implications for Measurement and Data Interpretation, medRxiv, 2021.
Hayek et al. Soluble Urokinase Plasminogen Activator Receptor Levels and Outcomes in Patients with Heart Failure, Card Fail. 2023, 29(2): 158-167.
Sellier et al. A Humanized Mouse Model of Idiopathic Nephrotic Syndrome Suggests a Pathogenic Role for Immature Cells, J Am Soc Nephrol 18: 2732-2739, 2007.
Sugimoto et al. Cure of relapsing nephrosis by an allogeneic marrow graft for chronic myelogenous leukemia, Pediatr Nephrol (2013) 28:975-978.
Riisbro R, Christensen IJ, Hogdall C, Brunner N, Hogdall E. Soluble urokinase plasminogen activator receptor measurements: influence of sample handling. Int J Biol Markers 2001;16:233-9.
Rudnick MR, Goldfarb S, Wexler L, Ludbrook PA, Murphy MJ, Halpern EF, Hill JA, Winniford M, Cohen MB and VanFossen DB. Nephrotoxicity of ionic and nonionic contrast media in 1196 patients: a randomized trial. The Iohexol Cooperative Study. Kidney Int. 1995;47:254-61.
Saudek et al., "A Preliminary Trial of the Programmable Implantable Medication System for Insulin Delivery," N. Engl. J. Med (1980) 321:574.
Schaefer F, Trachtman H, Wuhl E, et al. Association of Serum Soluble Urokinase Receptor Levels With Progression of Kidney Disease in Children. JAMA Pediatr 2017;171:e172914.
Schreier et al., "Specific Targeting of Liposomes to Cells using a GPI-Anchored Ligand; Influence of Liposome Composition on Intracellular Trafficking," J. Biol Chem (1994) 269:9090.
Schulz CA, Persson M, Christensson A, et al. Soluble Urokinase-type Plasminogen Activator Receptor (suPAR) and Impaired Kidney Function in the Population-based Malmo Diet and Cancer Study. Kidney Int Rep 2017;2:239-47.
Sefton (1987) CRC Crit Ref Biomed Eng 14:20.
Sidman et al., "Controlled Release of Macromolecules and Pharmaceuticals from Synthetic Polypeptides based on Glutamic Acid," Biopolymers (1983) 22:547-556.
Slamon et al., "Use of Chemotherapy plus a Monoclonal Antibody against HER2 for Metastatic Breast Cancer that Overexpresses HER2," New Engl. J. Med (2001) 344:783-792.
Solomon R, Werner C, Mann D, D'Elia J, Silva P. Effects of saline, mannitol, and furosemide on acute decreases in renal function induced by radiocontrast agents. N Engl J Med 1994;331:1416-20.
Song et al., (1995) PDA Journal of Pharmaceutical Science and Technology 50:372-397.
Tavakoli R, Lebreton G. Biomarkers for early detection of cardiac surgery-associated acute kidney injury. J Thorac Dis 2018;10:S3914-S8.
Thuno M, Macho B, Eugen-Olsen J. suPAR: the molecular crystal ball. Disease markers 2009;27:157-72.
Thurman JM, Lucia MS, Ljubanovic D, Holers VM. Acute tubular necrosis is characterized by activation of the alternative pathway of complement. Kidney Int 2005;67:524-30.
Tong J, Li H, Zhang H, Luo Z, Huang Y, Huang J, He F and Fu J. Neutrophil Gelatinase-associated Lipocalin in the Prediction of Contrast-induced Nephropathy: A Systemic Review and Meta-analysis. J Cardiovasc Pharmacol. 2015;66:239-45.
Tran MT, Zsengeller ZK, Berg AH, et al. PGC1alpha drives NAD biosynthesis linking oxidative metabolism to renal protection. Nature 2016;531:528-32.
Tsai TT, Patel UD, Chang TI, et al. Contemporary incidence, predictors, and outcomes of acute kidney injury in patients undergoing percutaneous coronary interventions: insights from the NCDR Cath-PCI registry. JACC Cardiovasc Interv 2014;7:1-9.
Umezawa "Liposome Targeting to Mouse Brain: Mannose as a Recognition Marker," Biochem Biophys Res Commun (1988) 153:1038.
Wang K, Duan CY, Wu J, Liu Y, Bei WJ, Chen JY, He PC, Liu YH and Tan N. Predictive Value of Neutrophil Gelatinase-Associated Lipocalin for Contrast-Induced Acute Kidney Injury After Cardiac Catheterization: A Meta-analysis. Can J Cardiol. 2016;32:1033 e19-29.

(56) References Cited

OTHER PUBLICATIONS

Wang Y, Bellomo R. Cardiac surgery-associated acute kidney injury: risk factors, pathophysiology and treatment. Nat Rev Nephrol 2017;13:697-711.

Wei C, El Hindi S, Li J, et al. Circulating urokinase receptor as a cause of focal segmental glomerulosclerosis. Nat Med 2011;17:952-60.

Wei C, Li J, Adair BD, et al. uPAR isoform 2 forms a dimer and induces severe kidney disease in mice. J Clin Invest 2019.

Wei C, Moller CC, Altintas MM, et al. Modification of kidney barrier function by the urokinase receptor. Nat Med 2008; 14:55-63.

Wei C, Trachtman H, Li J, et al. Circulating suPAR in two cohorts of primary Fsgs. J Am Soc Nephrol 2012;23:2051-9.

Weisbord SD, Gallagher M, Jneid H, et al. Outcomes after Angiography with Sodium Bicarbonate and Acetylcysteine. N Engl J Med 2018;378:603-14.

Wilhelm-Leen E, Montez-Rath ME and Chertow G. Estimating the Risk of Radiocontrast-Associated Nephropathy. J Am Soc Nephrol. 2017;28:653-659.

Xu SY, Carlson M, Engstrom A, Garcia R, Peterson CG and Venge P. Purification and characterization of a human neutrophil lipocalin (HNL) from the secondary granules of human neutrophils. Scand J Clin Lab Invest. 1994;54:365-76.

Yang et al., "A Randomized Trial of Bevacizumab, an Anti-Vascular Endothelial Growth Factor Antibody, for Metastatic Renal Cancer," New Engl. J. Med (2003) 349:427-434.

Ympa YP, Sakr Y, Reinhart K, Vincent JL. Has mortality from acute renal failure decreased? A systematic review of the iterature. The American journal of medicine 2005;118:827-32.

Zapata et al., "Engineering Linear F(ab')2 Fragments for Efficient Production in *Escherichia coli* and Enhanced Antiproliferative Activity," Protein Eng (1995) 8:1057-1062.

* cited by examiner

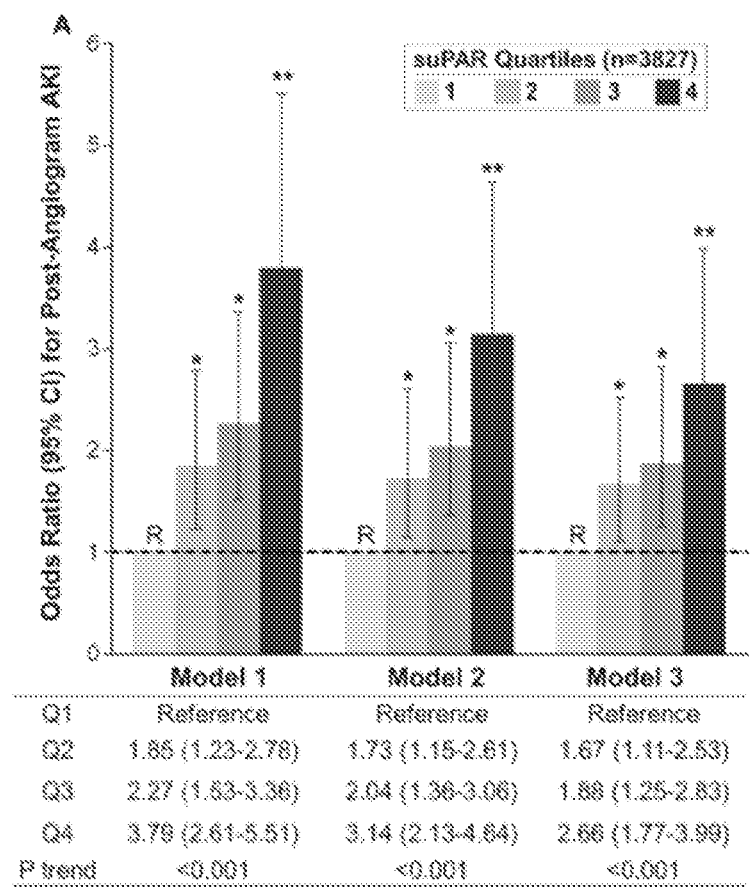

Figure 1B. SuPAR and the risk of AKI

| Subgroup | N | Odds Ratio (95% CI) | P Value |
|---|---|---|---|
| All patients | 3827 | | 2.95 (2.24-3.88) |
| Age (yr) | | | 0.71 |
| Age<65 | 1705 | | 2.97 (1.89-4.65) |
| Age≥65 | 2122 | | 2.66 (1.86-3.80) |
| Gender | | | 0.14 |
| Male | 2637 | | 2.67 (1.93-3.69) |
| Female | 1190 | | 4.24 (2.50-7.21) |
| CKD stage III | | | 0.71 |
| Yes | 1255 | | 2.54 (1.65-3.90) |
| No | 2572 | | 2.27 (1.51-3.42) |
| CHF | | | 0.47 |
| Yes | 1282 | | 2.49 (1.64-3.80) |
| No | 2545 | | 3.07 (2.13-4.43) |
| DM | | | 0.49 |
| Yes | 1345 | | 3.15 (2.08-4.76) |
| No | 2482 | | 2.59 (1.78-3.75) |
| Acute Myocardial Infarction | | | 0.48 |
| Yes | 496 | | 3.79 (1.81-7.94) |
| No | 3331 | | 2.85 (2.12-3.82) |
| Revascularization | | | 0.03 |
| Yes | 2048 | | 4.03 (2.65-6.12) |
| No | 1779 | | 2.16 (1.50-3.12) |
| Contrast volume | | | 0.11 |
| ≤155 ml | 1823 | | 2.40 (1.69-3.42) |
| >155 ml | 1904 | | 3.78 (2.45-5.85) |
| Cohort | | | 0.92 |
| EmCAB | 2752 | | 2.68 (1.90-3.78) |
| CASABLANCA | 1075 | | 2.60 (1.56-4.33) |

0.5  1  2  4  8

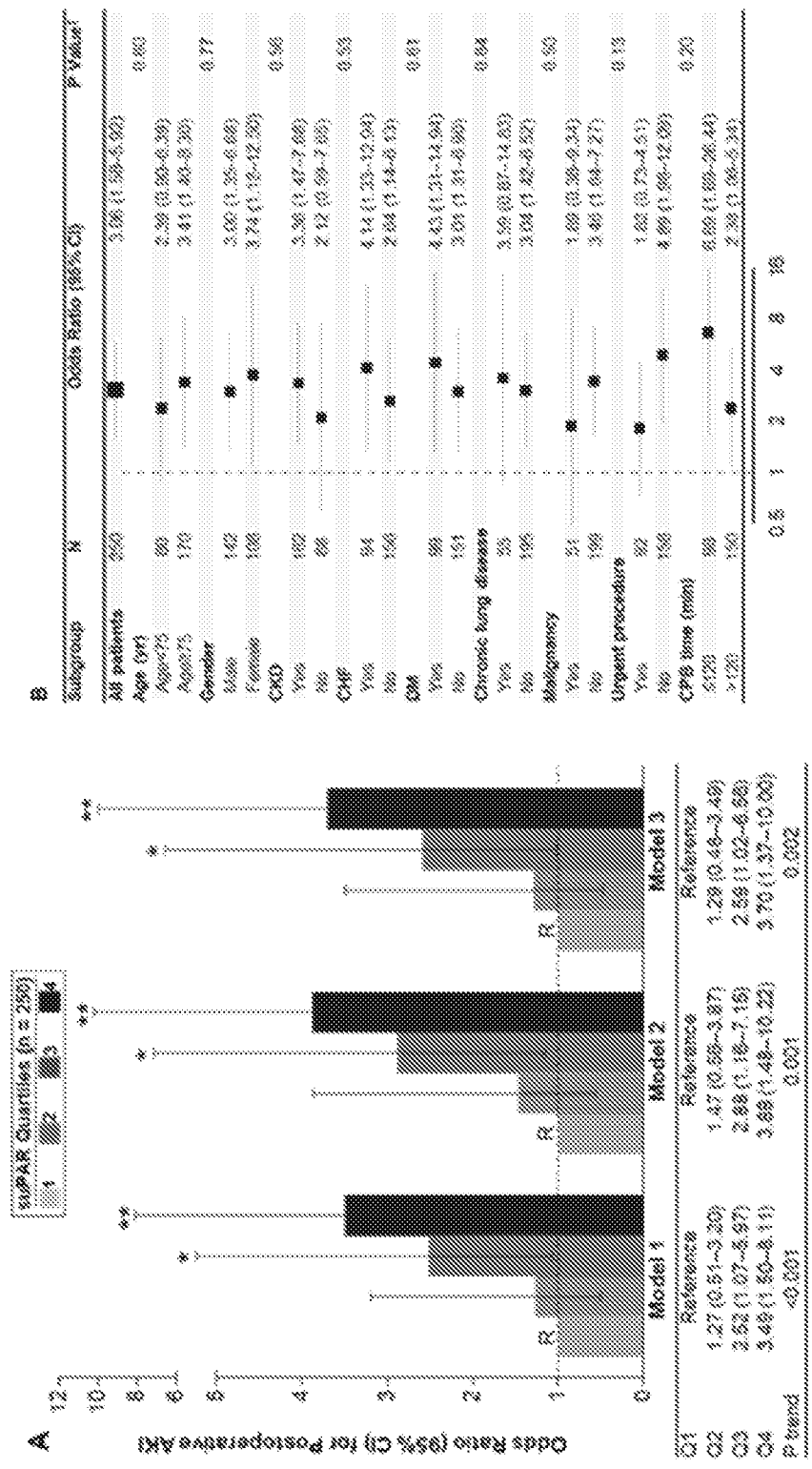
Figure 2A-2B. SuPAR and the risk of AKI in cardiac surgery and ICU cohorts

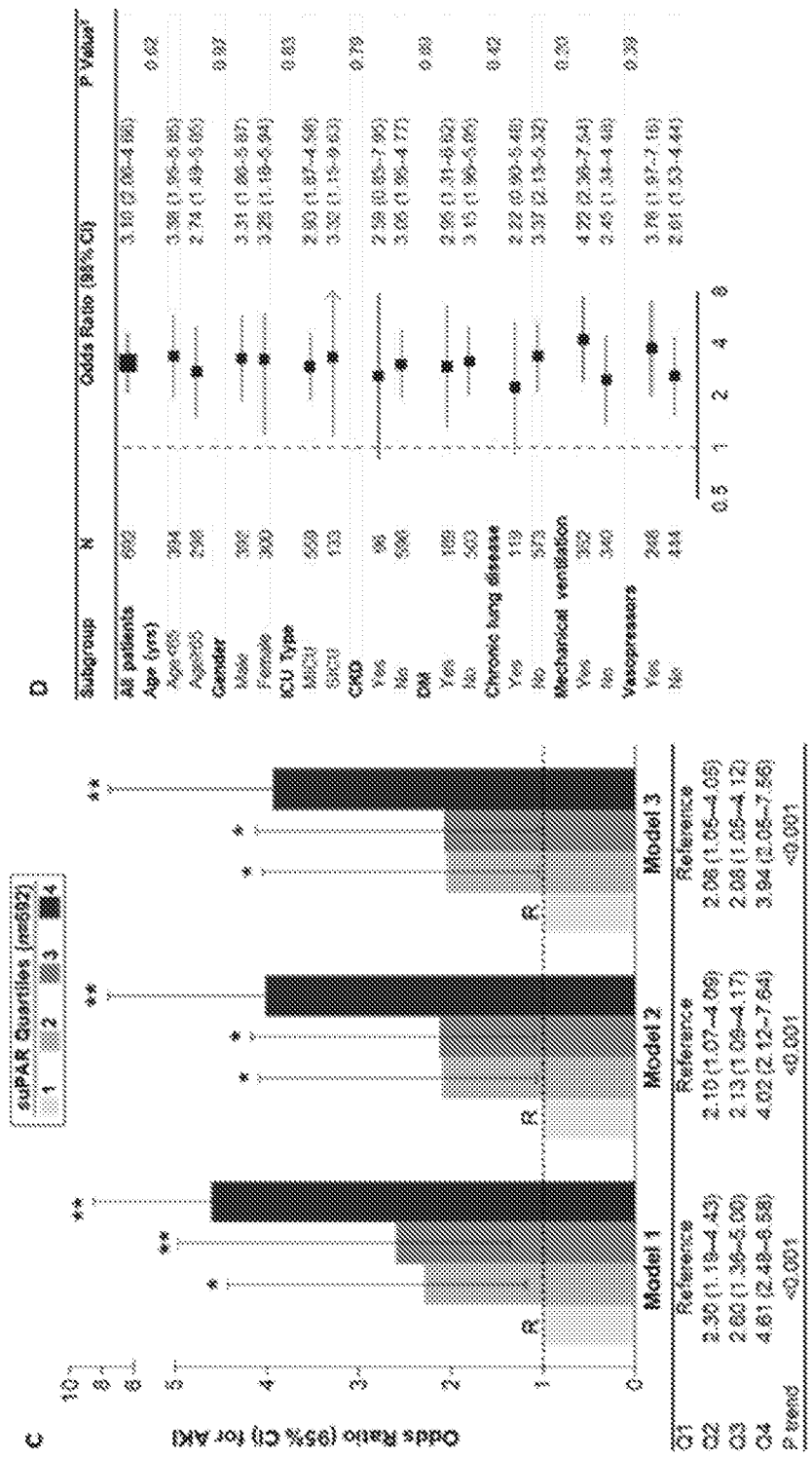

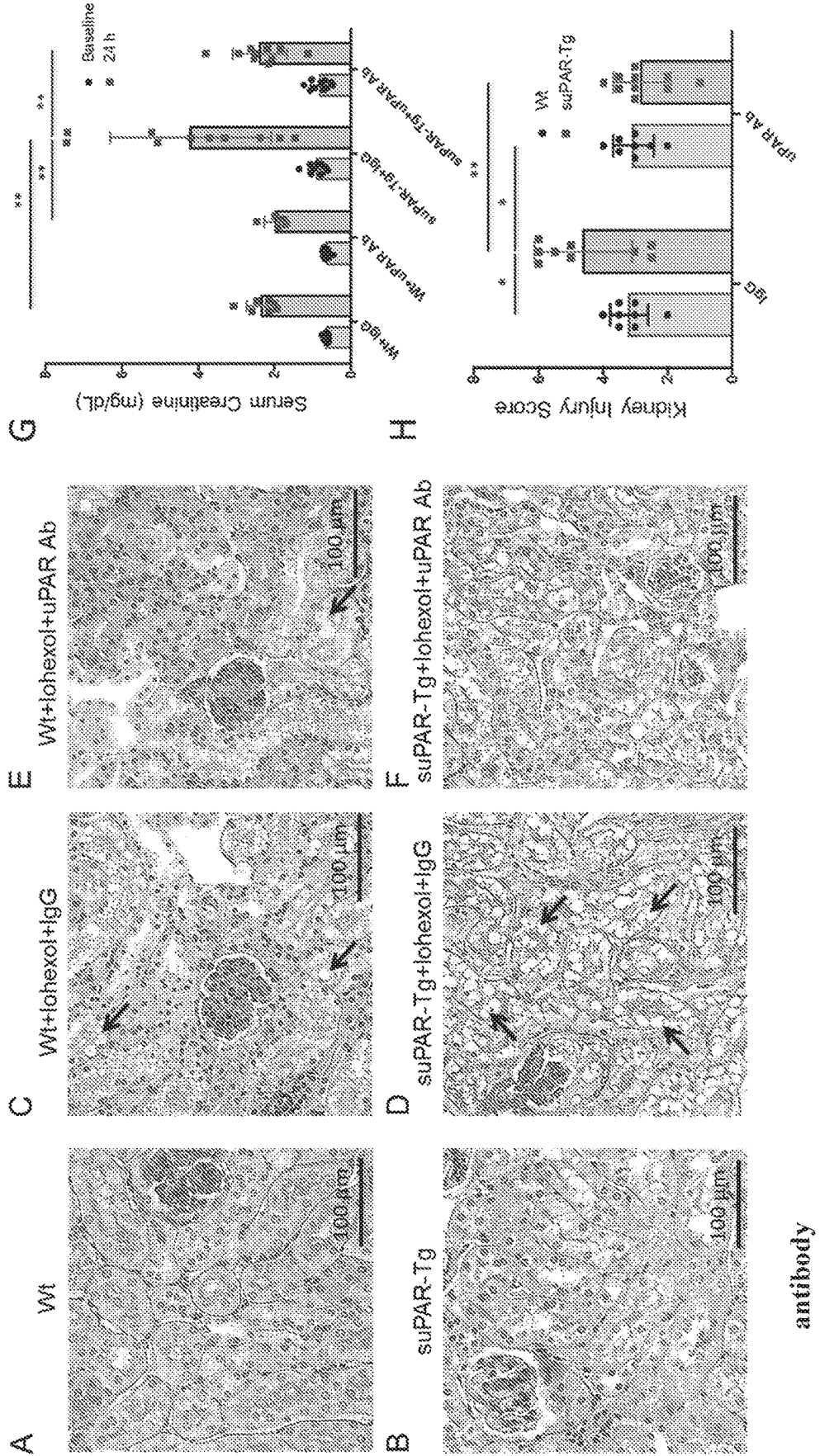
Figure 3. Acute kidney injury in wild-type and transgenic mice pre and post treatment with anti-suPAR monoclonal antibody

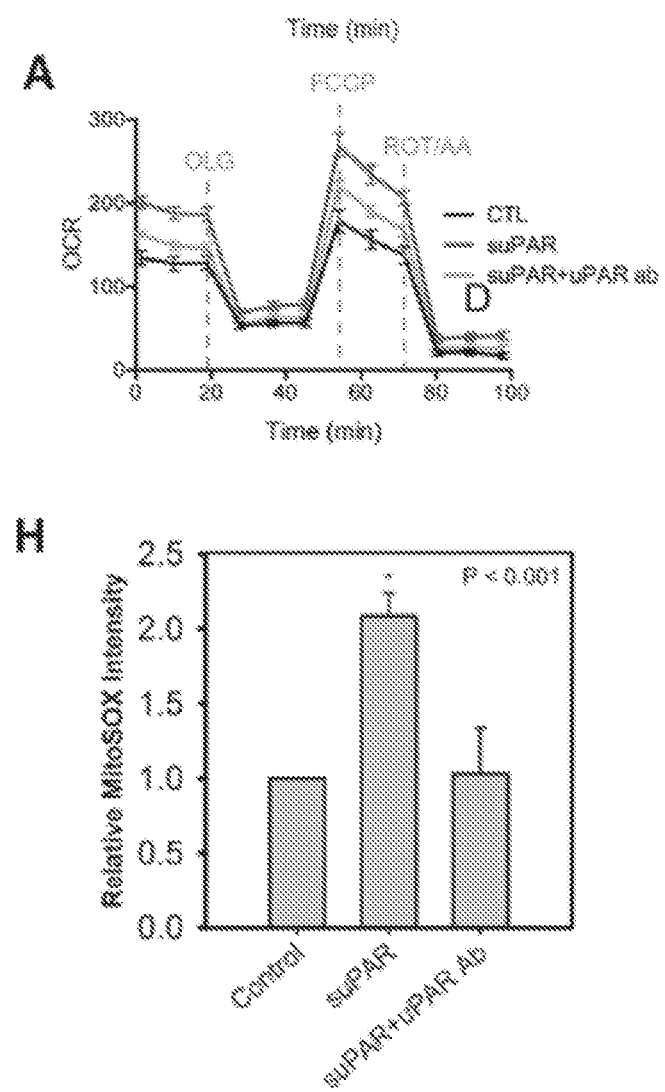
Figure 4. Bioenergetics profile and superoxide production of human podocytes proximal tubular cells treated with recombinant suPAR and uPAR antibody

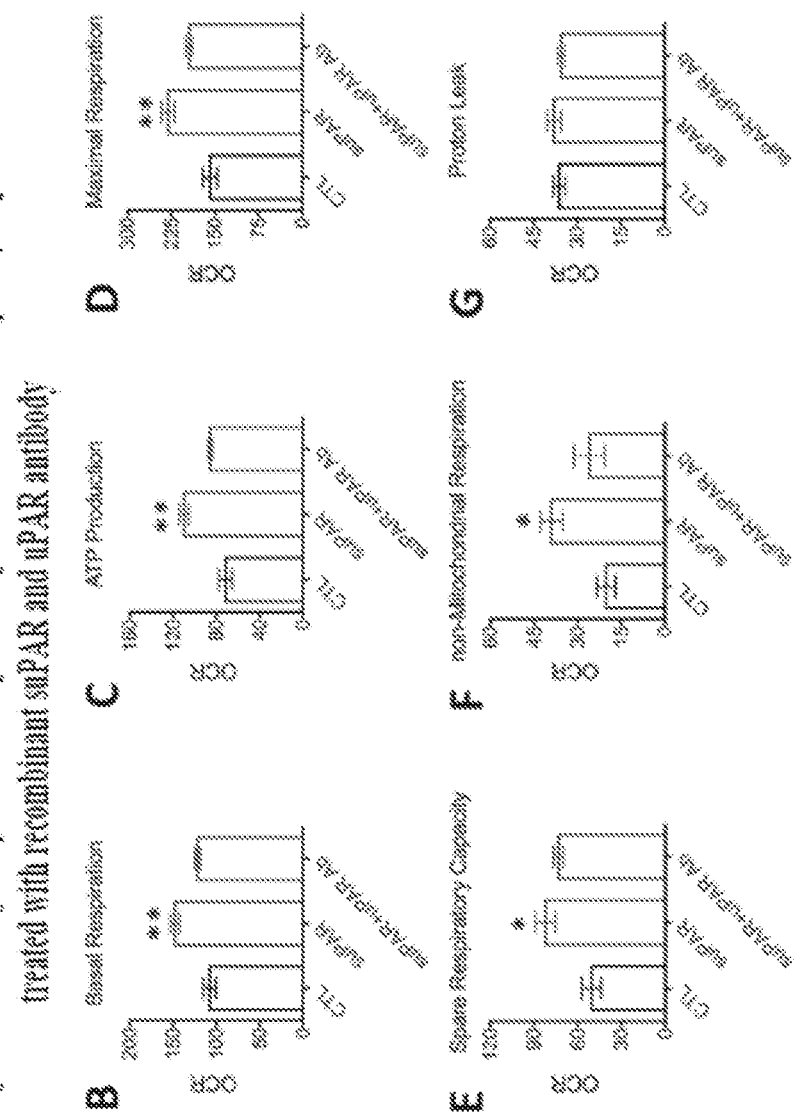

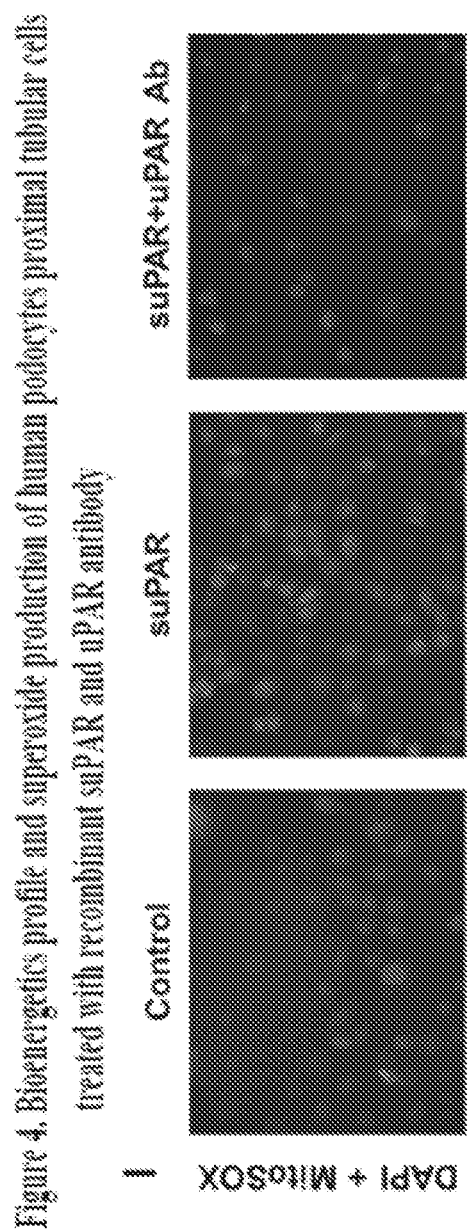
Figure 4. Bioenergetics profile and superoxide production of human podocytes proximal tubular cells treated with recombinant suPAR and uPAR antibody Figure 5. Pre-procedural suPAR levels and AKI severity
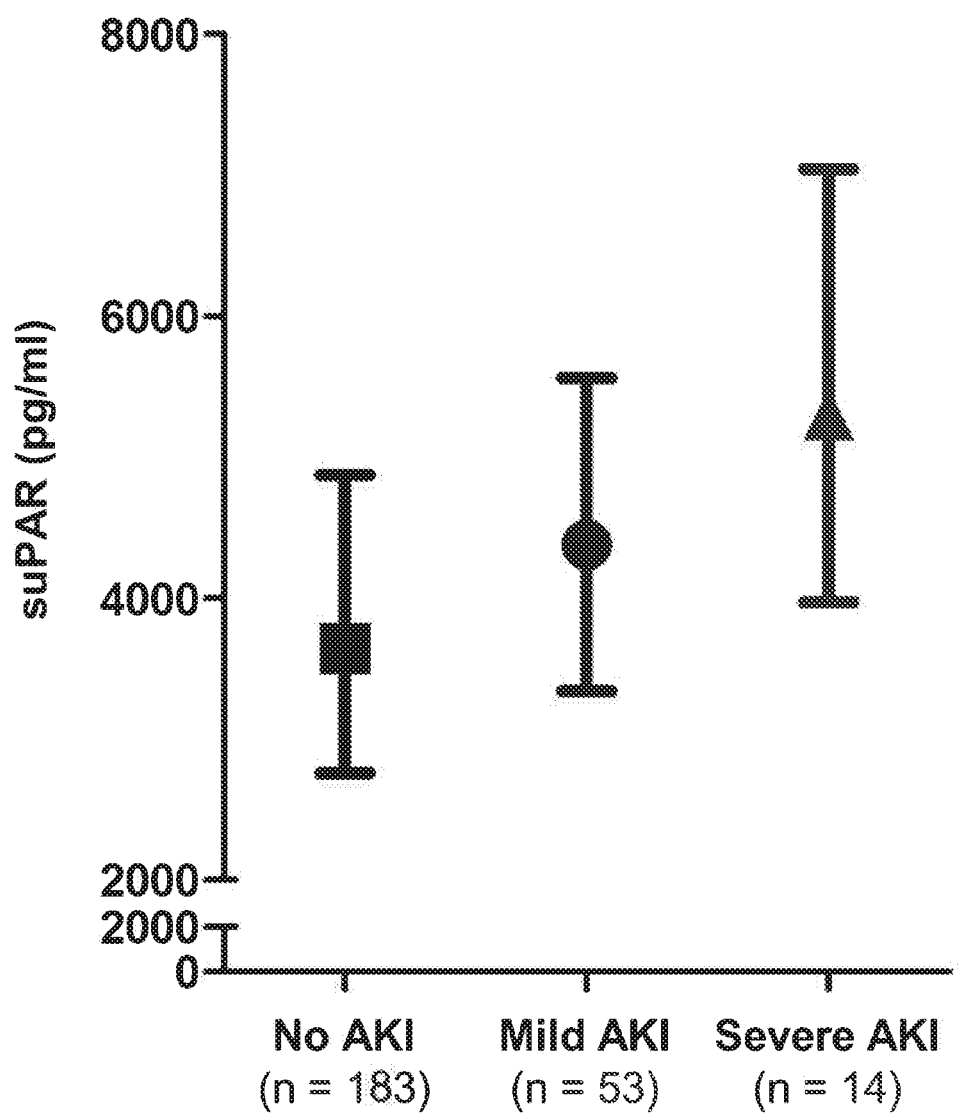

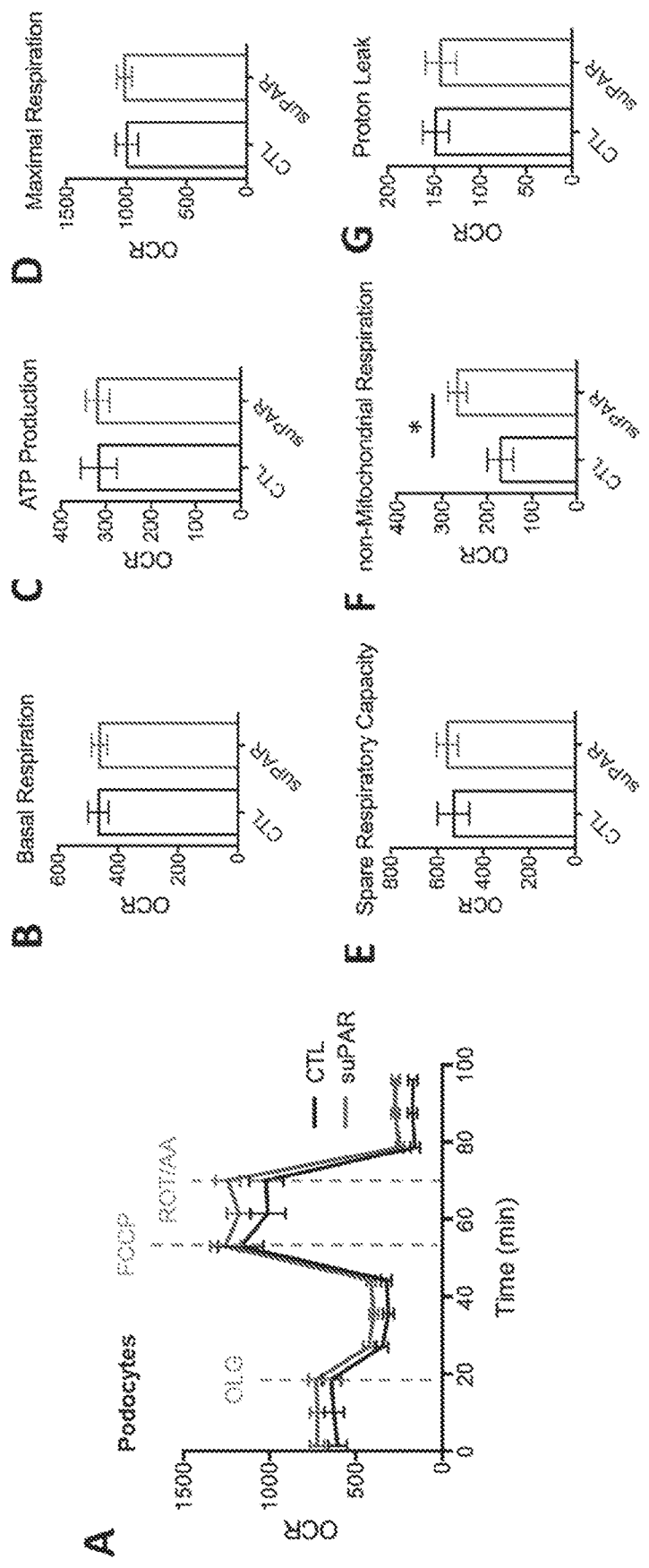

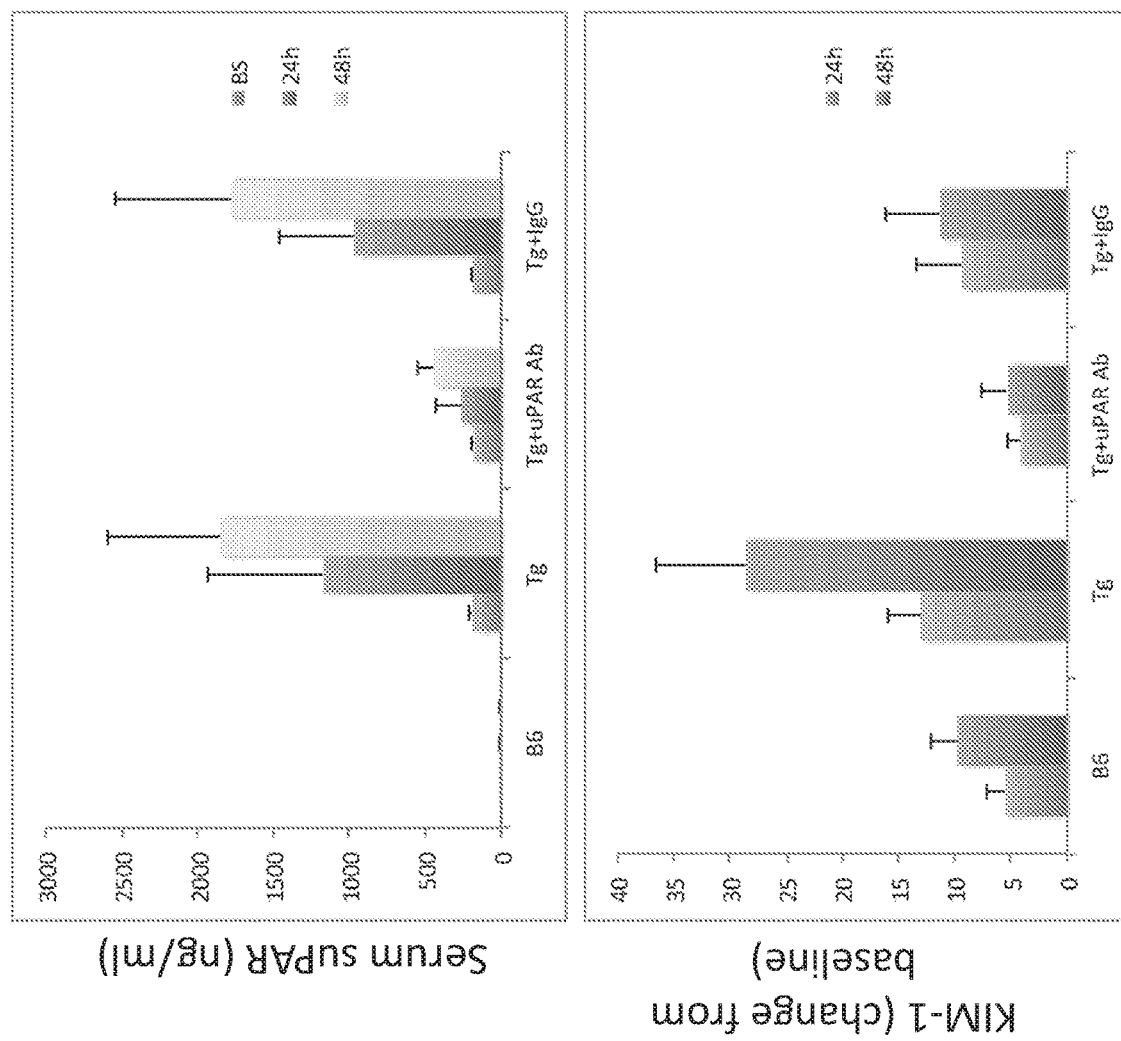

suPAR AND PREDICTION AND TREATMENT OF ACUTE KIDNEY INJURY

RELATED APPLICATIONS

This application is the National Stage of International Application No. PCT/US2019/053802 filed Sep. 30, 2019, which claims the benefit of U.S. Provisional Application No. 62/738,403, filed Sep. 28, 2018. The entirety of each of these applications is hereby incorporated by reference for all purposes.

BACKGROUND

1. Technical Field

Described herein are methods and compositions for identifying subjects that are at risk for developing acute kidney injury, and for methods for treating subjects at risk for developing or are suffering from acute kidney injury. These methods, and compositions are useful for identifying subjects at risk for developing acute kidney injury prior to undergoing a medical intervention of any type, including where a contrast agent is used in connection with a medical procedure, surgical intervention, imaging test, or diagnostic test.

2. Background Information

Acute kidney injury (AKI) is a global problem with rising incidence that affects one in five hospitalized adults worldwide.[1, 2] It has a major impact on morbidity and healthcare utilization, with even small changes in kidney function having been shown to be associated with both short- and long-term complications, including incident and progressive chronic kidney disease (CKD), end-stage renal disease (ESRD), and death.[2-4] The largest burden of AKI lies with critically ill patients and those with cardiovascular disease, who are at higher risk for both AKI and CKD due to their older age and multiple comorbid conditions, as well as their greater likelihood of undergoing procedures that may directly impact the kidneys, such coronary angiography or cardiac surgery.[4-6]

Contrast induced nephropathy (CIN) is the third most common cause for hospital acquired kidney injury and constitutes 1% of admission diagnosis from a data set of 7.8 million hospitalizations[48, 49]. Within patients receiving contrast, the reported incidence of CIN in the general population is variable but reportedly between 3-19% following contrast tomography and 9% after peripheral angiography and 7.3% as per The National Cardiovascular Data Registry (NCDR)[50, 51, 36]. While patients without risk factors have very low incidence of CIN, it is much higher in patients with risk factors including advanced age, pre-existing chronic kidney disease (CKD), diabetes, proteinuria, heart failure, myocardial infarction, pre-procedure shock, high contrast volume and anemia[52-56]. The incidence is up to 34% patients with both CKD and diabetes[54]. CIN is associated with worse clinical outcomes including prolonged hospitalization and higher costs, progression to chronic kidney disease or end-stage kidney failure requiring dialysis, and in-hospital mortality[54, 57].

Although risk scores have been proposed to predict CIN, uptake in clinical practice has been limited. Despite the high prevalence of CIN in patients with risk factors, there is lack of biomarker readily clinically available for risk stratification or possibly to guide preventative therapy such as intravascular repletion and avoiding nephrotoxins[58]. Novel biomarkers of acute kidney injury such as cystatin-C[59-63], and Neutrophil gelatinase-associated lipocalin (NGAL)[64-66] have been identified in recent years for early recognition of CIN. They have however fallen short in from being translated to the clinic as readily available biomarkers to predict CIN.

Despite recent gains in our understanding of the causes and underlying mechanisms of AKI, few therapeutic or preventive options exist.[7] Thus, uncovering novel therapeutic targets for AKI prevention is of paramount importance.

Inflammation and oxidative stress are central components of the pathogenesis of AKI, implicating multiple subtypes of immune cells.[8,9] Recently, evidence of a pathway linking the bone marrow to kidney injury has emerged, involving the production of a three finger protein structured immunotoxin; soluble urokinase plasminogen activator receptor (suPAR), by immature myeloid cells.[7, 10-17] SuPAR is the circulating form of a glycosyl-phosphatidylinositol-anchored three-domain membrane protein normally expressed at very low levels on a variety of cells, including endothelial cells, podocytes, and with induced expression immunologically active cells such as monocytes and lymphocytes.[11, 16, 18] Chronic exposure to elevated suPAR levels has a direct effect on the kidneys through pathologic activation of $\alpha v\beta 3$ integrin expressed by podocytes, resulting in podocyte effacement and proteinuria.[7, 12, 16, 19] While we and others have found that suPAR levels are strongly predictive of progressive decline in kidney function,[17, 20-24] whether suPAR has an impact on kidney tubular cells—the cells most affected in AKI—is unknown.

High suPAR is a risk factor for AKI. In subjects undergoing medical procedures such as coronary angiography and cardiovascular surgery or in subjects that are critically ill, the risk for developing AKI is high, or in subjects needing a contrast agent in connection with MRI or CT. What is needed are methods and compositions for identifying and treating the subjects at risk for AKI via pharmacologic inhibition of suPAR.

BRIEF SUMMARY

Methods and compositions for treating acute kidney injury in a subject are provided. The methods include measuring or having measured a level of soluble urokinase plasminogen activator receptor (suPAR) in a biological sample from the subject, determining or having determined the level of suPAR in the sample compared to a control suPAR level, and administering a therapeutically effective amount of an agent that antagonizes soluble urokinase plasminogen activator receptor (suPAR) to the subject having an elevated level of suPAR relative to the control suPAR level.

BRIEF DESCRIPTION OF THE DRAWINGS

FIGS. 1A and 1B show suPAR and the risk of post-angiography AKI.

FIG. 1A is a bar graph depicting odds ratios and 95% confidence intervals for acute kidney injury according to pre-procedural suPAR quartiles. Model 1 was unadjusted; model 2 was adjusted for age, gender, race, smoking history, diabetes mellitus, congestive heart failure, hypertension; and model 3 incorporated the aforementioned variables in addition to acute myocardial infarction, revascularization, baseline kidney function and contrast volume. Quartile 1 was the reference (R) group in all models. FIG. 1B shows the risk of AKI based on suPAR levels according to subgroups. SuPAR levels were natural log-transformed given their skewed distribution. †Refers to P-value for the interaction between subgroups. Abbreviations: CHF, congestive heart failure; CKD, chronic kidney disease (defined as an eGFR<60 ml/min per 1.73 m2), DM, diabetes mellitus II. *P<0.05; **P<0.001.

FIGS. 2A-2D. SuPAR and the risk of AKI in cardiac surgery and ICU cohorts. FIGS. 2A and 2C are bar graphs depicting odds ratios and 95% confidence intervals for acute kidney injury according to pre-procedural suPAR quartiles in the cardiac surgery (FIG. 2A) and ICU (FIG. 2C) cohorts. For the surgical cohort, model 1 was unadjusted; model 2 was adjusted for age, gender, race, smoking history, diabetes mellitus, congestive heart failure, hypertension; and model 3 incorporated the aforementioned variables in addition to urgent procedure and cardiopulmonary bypass time. For the ICU cohort, model 1 was unadjusted, model 2 was adjusted for age, gender, race, baseline eGFR, diabetes mellitus, congestive heart failure, chronic lung disease, and chronic liver disease, and model 3 was further adjusted for vasopressors received during the first 24 h of ICU admission, mechanical ventilation during the first 24 h of ICU admission, and the hemoglobin and white blood cell count on ICU admission. Quartile 1 was the reference (R) group in all models. FIGS. 2B and 2D show the risk of AKI based on suPAR levels according to relevant subgroups in the surgical (FIG. 2B) and ICU (FIG. 2D) cohorts. SuPAR levels were natural log-transformed given their skewed distribution. †Refers to P-value for the interaction between subgroups. Abbreviations: CHF, congestive heart failure; CKD, chronic kidney disease (defined as an eGFR<60 ml/min per 1.73 m2), DM, diabetes mellitus II, ICU, intensive care unit. *P<0.05; **P<0.001.

FIGS. 3A-3H. Acute kidney injury in wild-type and transgenic mice pre and post treatment with anti-suPAR monoclonal antibody. FIGS. 3A-3F show representative high-power kidney histology using Period Acid Schiff stain, of wild-type (Wt) and suPAR transgenic mice (suPAR-Tg) at baseline (FIGS. 3A and 3B), and 48 hours after iohexol (FIGS. 3C-3F) stratified by treatment—IgG isotype (FIGS. 3C, 3D) or uPAR monoclonal antibody (uPAR Ab, FIGS. 3E, 3F). Wt and suPAR-Tg mice had largely normal kidney morphology at baseline. 48 hours after iohexol, tubular vacuolization could be seen in all Wt or suPAR-Tg mice (black arrows). SuPAR-Tg which received uPAR Ab (FIG. 3F) had significantly less severe tubular vacuolization compared to counterparts which received IgG isotype (FIG. 3D). FIG. 3G shows serum creatinine levels measured before and after contrast administration. Compared to baseline, 24 hours after iohexol injection, serum creatinine was increased in all examined groups. SuPAR-Tg+IgG mice had much higher levels of creatinine than any other groups. There was no difference between the groups at baseline. Two-way ANOVA (P=0.0051 for interaction). Panel H represents a semi-quantitative scoring system that accounts for glomerular and tubular changes associated with AKI. SuPAR-Tg+ uPAR Ab mice had more severe renal injuries than any other studied groups. *P<0.05, **P<0.01. Two-way ANOVA (P=0.018 for interaction). Bars represent mean, and errors bars represent+/−1 standard deviation.

FIGS. 4A-4I. Bioenergetics profile of human podocytes and proximal tubular cells treated with recombinant suPAR and uPAR antibody. FIG. 4A represents the consumption rate (OCR) curves and Seahorse XF™ analyzer measurements of parameters of mitochondrial respiration of human proximal tubular cells (HK-2). After 24 hours of treatment with media alone (CTL), recombinant suPAR, or suPAR+ uPAR antibody, OCR was measured in real time under basal conditions and in response to sequential injections of mitochondrial inhibitors including oligomycin (OLG; an ATP synthase inhibitor), FCCP (an un-coupler of ATP synthesis from oxygen consumption), rotenone (ROT; complex I inhibitor), and antimycin A (AA; complex III inhibitor) using the Seahorse XF24™ extracellular flux analyzer. Each OCR value was normalized to cell number and are presented as pmol/min/100,000 cells. SuPAR-treated HK-2 cells are more energetic at their basal state (FIG. 4B), with enhanced mitochondrial respiration as evidenced by a significantly higher rates of ATP production (FIG. 4C), maximal respiration (FIG. 4D) and spare respiratory capacity (FIG. 4E). HK-2 cells have higher non-mitochondrial respiration in the presence of suPAR (FIG. 4F). However, suPAR does not affect proton leak (FIG. 4G). FIGS. 4H and 4I show Mito-SOX™ (mitochondrial superoxide indicator is highlighted in red; blue (DAPI) indicates nuclei) fluorescence after 24 h treatment, measured as integrated combined area and intensity per cell for each high power field (20× magnification) using ImageJ™ software (results normalized to controls, and averaged over three experiments). Cells were treated with vehicle (PBS, control), suPAR (10 ng/mL), suPAR (10 ng/mL) plus blocking uPAR antibody (50 ng/mL). Note how suPAR effects are abrogated by the uPAR antibody. Values are mean+SEM for 3 independent determinations. *, indicates P<0.001. Abbreviations: ATP: ATP production, BR: basal respiration, DAPI: 4',6-diamidino-2-phenylindole, MaxR: maximal respiration, SRC: spare respiratory capacity, nMitR: non-mitochondrial respiration; PL: proton leak.

FIG. 5. Preprocedural suPAR and AKI Severity. Data are shown as median (IQR). Mild AKI was defined as KDIGO Stage 1. Severe AKI was defined as KDIGO stage 2 or 3. P<0.001 for trend FIGS. 6A-6G Mitochondrial respiratory function of human podocytes exposed to suPAR. The bioenergetic profiles of human podocytes (FIGS. 6A-6G) were determined simultaneously with oxygen consumption rate that was normalized with the cell number (OCR, pmol/min/100,000 cells). Overall, untreated (CTL) and suPAR-treated podocytes demonstrate similar mitochondrial responses (FIGS. 6A-6D, 6F) whereas non-mitochondrial respiration is induced by suPAR (FIG. 6E). Bar graphs for each parameter of the mitochondrial respiration were derived from the mean values (S.E.M.) of at least two independent experiments (n≥4). Significance was calculated by Student's t-test (podocytes) and was expressed as results of comparisons of each treatment group (*, P<0.05 and **, P<0.01 vs CTL).

FIG. 7 shows acute kidney injury in wild-type and transgenic mice pre and post treatment with anti-suPAR monoclonal antibody. suPAR levels measured before and after contrast administration. KIM-1 levels showing change from baseline 24 and 48 hours after contrast administration.

DETAILED DESCRIPTION

Figure 8:
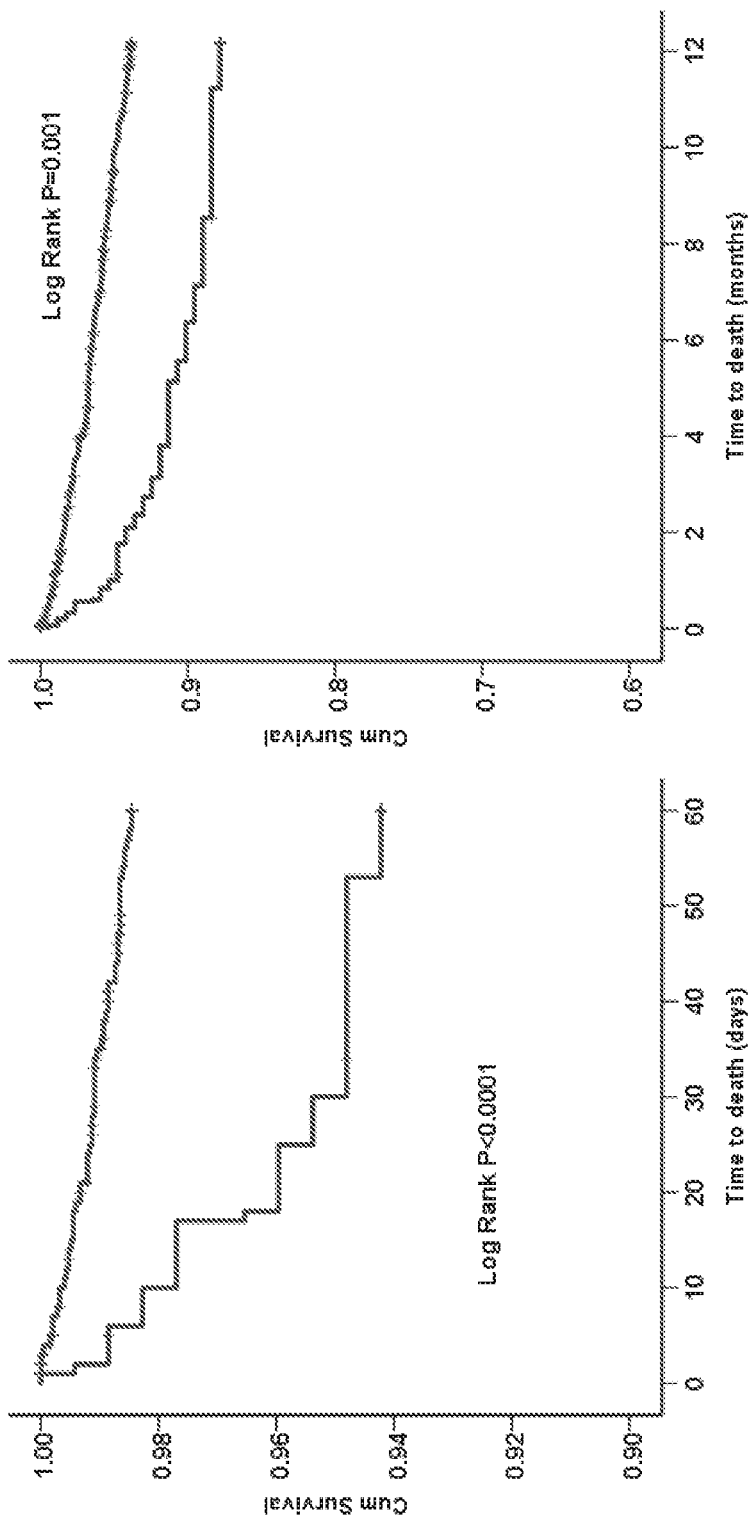
FIG. 8 shows Kaplan-Meier curves for the primary end point of 60 day and one year mortality in those with and without CIN.

Methods and compositions for treating acute kidney injury in a subject are provided. The methods include measuring or having measured a level of soluble urokinase plasminogen activator receptor (suPAR) in a biological sample from the subject, determining or having determined the level of suPAR in the sample compared to a control suPAR level, and administering a therapeutically effective amount of an agent that antagonizes soluble urokinase plasminogen activator receptor (suPAR) to the subject having an elevated level of suPAR relative to the control suPAR level. In some aspects, the agent is a suPAR antibody or antigen-binding fragment thereof that specifically binds to suPAR.

The term "antibody" as used herein refers to whole antibodies that interact with (e.g., by binding, steric hindrance, stabilizing/destabilizing, spatial distribution) a suPAR epitope and inhibit signal transduction. A naturally occurring "antibody" is a glycoprotein comprising at least two heavy (H) chains and two light (L) chains inter-connected by disulfide bonds. Each heavy chain is comprised of a heavy chain variable region (abbreviated herein as VH) and a heavy chain constant region. The heavy chain constant region is comprised of three domains, CHI, CH2 and CH3. Each light chain is comprised of a light chain variable region (abbreviated herein as VL) and a light chain constant region. The light chain constant region is comprised of one domain, CL. The VH and VL regions can be further subdivided into regions of hypervariability, termed complementarity determining regions (CDR), interspersed with regions that are more conserved, termed framework regions (FR). Each VH and VL is composed of three CDRs and four FRs arranged from amino-terminus to carboxy-terminus in the following order: FR1, CDR1, FR2, CDR2, FR3, CDR3, FR4. The variable regions of the heavy and light chains contain a binding domain that interacts with an antigen. The constant regions of the antibodies may mediate the binding of the immunoglobulin to host tissues or factors, including various cells of the immune system (e.g., effector cells) and the first component (Clq) of the classical complement system. The term "antibody" includes for example, monoclonal antibodies, human antibodies, humanized antibodies, camelised antibodies, chimeric antibodies, single-chain Fvs (scFv), disulfide-linked Fvs (sdFv), Fab fragments, F (ab') fragments, and anti-idiotypic (anti-Id) antibodies (including, e.g., anti-Id antibodies to antibodies of the invention), and epitope-binding fragments of any of the above. The antibodies can be of any isotype (e.g., IgG, IgE, IgM, IgD, IgA and IgY), class (e.g., IgGl, IgG2, IgG3, IgG4, IgAl and IgA2) or subclass. Both the light and heavy chains are divided into regions of structural and functional homology. The terms "constant" and "variable" are used functionally. In this regard, it will be appreciated that the variable domains of both the light (VL) and heavy (VH) chain portions determine antigen recognition and specificity. Conversely, the constant domains of the light chain (CL) and the heavy chain (CHI, CH2 or CH3) confer important biological properties such as secretion, transplacental mobility, Fc receptor binding, complement binding, and the like. By convention the numbering of the constant region domains increases as they become more distal from the antigen binding site or amino-terminus of the antibody. The N-terminus is a variable region and at the C-terminus is a constant region; the CH3 and CL domains actually comprise the carboxy-terminus of the heavy and light chain, respectively.

The phrase "antibody fragment", as used herein, refers to one or more portions of an antibody that retain the ability to specifically interact with (e.g., by binding, steric hindrance, stabilizing/destabilizing, spatial distribution) a suPAR epitope and inhibit signal transduction. Examples of binding fragments include, but are not limited to, a Fab fragment, a monovalent fragment consisting of the VL, VH, CL and CHI domains; a F(ab)$_2$ fragment, a bivalent fragment comprising two Fab fragments linked by a disulfide bridge at the hinge region; a Fd fragment consisting of the VH and CHI domains; a Fv fragment consisting of the VL and VH domains of a single arm of an antibody; a dAb fragment (Ward et al, (1989) Nature 341:544-546), which consists of a VH domain; and an isolated complementarity determining region (CDR).

Furthermore, although the two domains of the Fv fragment, VL and VH, are coded for by separate genes, they can be joined, using recombinant methods, by a synthetic linker that enables them to be made as a single protein chain in which the VL and VH regions pair to form monovalent molecules (known as single chain Fv (scFv); see e.g., Bird et al, (1988) Science 242:423-426; and Huston et al, (1988) Proc. Natl. Acad. Sci. 85:5879-5883). Such single chain antibodies are also intended to be encompassed within the term "antibody fragment". These antibody fragments are obtained using conventional techniques known to those of skill in the art, and the fragments are screened for utility in the same manner as are intact antibodies. Antibody fragments can also be incorporated into single domain antibodies, maxibodies, minibodies, intrabodies, diabodies, triabodies, tetrabodies, v-NAR and bis-scFv (see, e.g., Hollinger and Hudson, (2005) Nature Biotechnology 23: 1126-1136). Antibody fragments can be grafted into scaffolds based on polypeptides such as Fibronectin type III (Fn3) (see U.S. Pat. No. 6,703,199, which describes fibronectin polypeptide monobodies).

Antibody fragments can be incorporated into single chain molecules comprising a pair of tandem Fv segments (VH-CH1-VH-CH1) which, together with complementary light chain polypeptides, form a pair of antigen binding regions (Zapata et al., (1995) Protein Eng. 8: 1057-1062; and U.S. Pat. No. 5,641,870).

The phrases "monoclonal antibody" or "monoclonal antibody composition" as used herein refers to polypeptides, including antibodies, antibody fragments, bispecific antibodies, etc. that have substantially identical to amino acid sequence or are derived from the same genetic source. This term also includes preparations of antibody molecules of single molecular composition. A monoclonal antibody composition displays a single binding specificity and affinity for a particular epitope.

The phrase "human antibody", as used herein, includes antibodies having variable regions in which both the framework and CDR regions are derived from sequences of human origin. Furthermore, if the antibody contains a constant region, the constant region also is derived from such human sequences, e.g., human germline sequences, or mutated versions of human germline sequences or antibody containing consensus framework sequences derived from human framework sequences analysis, for example, as described in Knappik et al., (2000) J Mol Biol 296:57-86). The structures and locations of immunoglobulin variable domains, e.g., CDRs, may be defined using well known numbering schemes, e.g., the Kabat numbering scheme, the Chothia numbering scheme, or a combination of Kabat and Chothia (see, e.g., Sequences of Proteins of Immunological Interest, U.S. Department of Health and Human Services (1991), eds. Kabat et al.; Lazikani et al., (1997) J. Mol. Bio. 273:927-948); Kabat et al., (1991) Sequences of Proteins of Immunological Interest, 5th edit., NIH Publication no. 91-3242 U.S. Department of Health and Human Services; Chothia et al., (1987) J. Mol. Biol. 196:901-917; Chothia et al., (1989) Nature 342:877-883; and Al-Lazikani et al., (1997) J. Mol. Biol. 273:927-948. The human antibodies of the invention may include amino acid residues not encoded by human sequences (e.g., mutations introduced by random or site-specific mutagenesis in vitro or by somatic mutation in vivo, or a conservative substitution to promote stability or manufacturing). The phrase "human monoclonal antibody" as used herein refers to antibodies displaying a single binding specificity which have variable regions in which both the framework and CDR regions are derived from human sequences. In one embodiment, the human monoclonal antibodies are produced by a hybridoma which includes a B cell obtained from a transgenic nonhuman animal, e.g., a transgenic mouse, having a genome comprising a human heavy chain transgene and a light chain transgene fused to an immortalized cell.

The phrase "recombinant human antibody", as used herein, includes all human antibodies that are prepared, expressed, created or isolated by recombinant means, such as antibodies isolated from an animal (e.g., a mouse) that is transgenic or transchromosomal for human immunoglobulin genes or a hybridoma prepared therefrom, antibodies isolated from a host cell transformed to express the human antibody, e.g., from a transfectoma, antibodies isolated from a recombinant, combinatorial human antibody library, and antibodies prepared, expressed, created or isolated by any other means that involve splicing of all or a portion of a human immunoglobulin gene, sequences to other DNA sequences. Such recombinant human antibodies have variable regions in which the framework and CDR regions are derived from human germline immunoglobulin sequences. In certain embodiments, however, such recombinant human antibodies can be subjected to in vitro mutagenesis (or, when an animal transgenic for human Ig sequences is used, in vivo somatic mutagenesis) and thus the amino acid sequences of the $V_H$ and $V_L$ regions of the recombinant antibodies are sequences that, while derived from and related to human germline $V_H$ and $V_L$ sequences, may not naturally exist within the human antibody germline repertoire in vivo.

Specific binding between two entities means a binding with an equilibrium constant (KA) ($k_{on}/k_{off}$) of at least $10^2 M^{-1}$, at least $5 \times 10^2 M^{-1}$, at least $10^3 M^{-1}$, at least $5 \times 10^3 M^{-1}$, at least $10^4 M^-$ at least $5 \times 10^4 M^{-1}$, at least $10^5 M^{-1}$, at least $5 \times 10^5 M^{-1}$, at least $10^6 M^{-1}$, at least $5 \times 10^6 M^{-1}$, at least $10^7 M^{-1}$, at least $5 \times 10^7 M^{-1}$, at least $10^8 M^{-1}$, at least $5 \times 10^8 M^{-1}$, at least $10^9 M^{-1}$, at least $5 \times 10^9 M^{-1}$, at least $10^{10} M^{-1}$, at least $5 \times 10^{10} M^{-1}$, at least $10^{11} M^{-1}$, at least $5 \times 10^{11} M^{-1}$, at least $10^{12} M^{-1}$, at least $5 \times 10^{12} M^{-1}$, at least $10^{13} M^{-1}$ at least $5 \times 10^{13} M^{-1}$ at least $10^{14} M^{-1}$, at least $5 \times 10^{14} M^{-1}$ at least $10^{15} M^{-1}$, or at least $5 \times 10^{15} M^{-1}$. The phrase "specifically (or selectively) binds" to an antibody (e.g., a suPAR binding antibody) refers to a binding reaction that is determinative of the presence of a cognate antigen (e.g., a human suPAR) in a heterogeneous population of proteins and other biologics. In addition to the equilibrium constant (KA) noted above, a suPAR binding antibody of the invention typically also has a dissociation rate constant (KD) ($k_{off}/k_{on}$) of less than $5 \times 10^{-2} M$, less than $10^{-2} M$, less than $5 \times 10^{-3} M$, less than $10^{-3} M$, less than $5 \times 10^{-4} M$, less than $10^{-4} M$, less than $5 \times 10^{-5} M$, less than $10^{-5} M$, less than $5 \times 10^{-6} M$, less than $10^{-6} M$, less than $5 \times 10^{-7} M$, less than $10^{-7} M$, less than $5 \times 10^{-8} M$, less than $10^{-8} M$, less than $5 \times 10^{-9} M$, less than $10^{-9} M$, less than $5 \times 10^{-10} M$, less than $10^{-10} M$, less than $5 \times 10^{-11} M$, less than $10^{-11} M$, less than $5 \times 10^{-12} M$, less than $10^{-12} M$, less than $5 \times 10^{-13} M$, less than $10^{-13} M$, less than $5 \times 10^{-4} M$, less than $10^{-14} M$, less than $5 \times 10^{-15} M$, or less than $10^{-15} M$ or lower, and binds to suPAR with an affinity that is at least twofold greater than its affinity for binding to a non-specific antigen (e.g., HSA).

In one embodiment, the antibody or fragment thereof has dissociation constant (Ka) of less than 3000 pM, less than 2500 pM, less than 2000 pM, less than 1500 pM, less than 1000 pM, less than 750 pM, less than 500 pM, less than 250 pM, less than 200 pM, less than 150 pM, less than 100 pM, less than 75 pM, less than 10 pM, less than 1 pM as assessed using a method described herein or known to one of skill in the art (e.g., a BIAcore™ assay, ELISA, FACS, SET) (Biacore™ International AB, Uppsala, Sweden). The term "$K_{assoc}$" or "$K_a$", as used herein, refers to the association rate of a particular antibody-antigen interaction, whereas the term "Küs" or "$K_d$," as used herein, refers to the dissociation rate of a particular antibody-antigen interaction. The term "KD", as used herein, refers to the dissociation constant, which is obtained from the ratio of Kj to $K_a$ (i.e. Kj/$K_a$) and is expressed as a molar concentration (M). KD values for antibodies can be determined using methods well established in the art. A method for determining the KD of an antibody is by using surface plasmon resonance, or using a biosensor system such as a BIACORE™ system.

The term "affinity" as used herein refers to the strength of interaction between antibody and antigen at single antigenic sites. Within each antigenic site, the variable region of the antibody "arm" interacts through weak non-covalent forces with antigen at numerous sites; the more interactions, the stronger the affinity. The term "avidity" as used herein refers to an informative measure of the overall stability or strength of the antibody-antigen complex. It is controlled by three major factors: antibody epitope affinity; the valence of both the antigen and antibody; and the structural arrangement of the interacting parts. Ultimately these factors define the specificity of the antibody, that is, the likelihood that the particular antibody is binding to a precise antigen epitope.

The term "valency" as used herein refers to the number of potential target binding sites in a polypeptide. Each target binding site specifically binds one target molecule or specific site (i.e, epitope) on a target molecule. When a polypeptide comprises more than one target binding site, each target binding site may specifically bind the same or different molecules (e.g., may bind to different molecules, e.g., different antigens, or different epitopes on the same molecule).

The phrase "antagonist antibody" as used herein refers to an antibody that binds with suPAR and neutralizes the biological activity of suPAR signaling, e.g., reduces, decreases and/or inhibits suPAR induced signaling activity. Accordingly, an antibody that "inhibits" one or more of these suPAR functional properties (e.g., biochemical, immunochemical, cellular, physiological or other biological activities, or the like) as determined according to methodologies known to the art and described herein, will be understood to relate to a statistically significant decrease in the particular activity relative to that seen in the absence of the antibody (e.g., or when a control antibody of irrelevant specificity is present). An antibody that inhibits suPAR activity effects such a statistically significant decrease by at least 10% of the measured parameter, by at least 50%>, 80%> or 90%>, and in certain embodiments an antibody may inhibit greater than 95%, 98% or 99% of suPAR functional activity.

The phrase "isolated antibody" refers to an antibody that is substantially free of other antibodies having different antigenic specificities (e.g., an isolated antibody that specifically binds suPAR is substantially free of antibodies that specifically bind antigens other than suPAR). An isolated antibody that specifically binds suPAR may, however, have cross-reactivity to other antigens. Moreover, an isolated antibody may be substantially free of other cellular material and/or chemicals.

The phrase "conservatively modified variant" applies to both amino acid and nucleic acid sequences. With respect to particular nucleic acid sequences, conservatively modified variants refers to those nucleic acids which encode identical or essentially identical amino acid sequences, or where the nucleic acid does not encode an amino acid sequence, to essentially identical sequences. Because of the degeneracy of the genetic code, a large number of functionally identical nucleic acids encode any given protein. For instance, the codons GCA, GCC, GCG and GCU all encode the amino acid alanine. Thus, at every position where an alanine is specified by a codon, the codon can be altered to any of the corresponding codons described without altering the encoded polypeptide. Such nucleic acid variations are "silent variations," which are one species of conservatively modified variations. Every nucleic acid sequence herein which encodes a polypeptide also describes every possible silent variation of the nucleic acid. One of skill will recognize that each codon in a nucleic acid (except AUG, which is ordinarily the only codon for methionine, and TGG, which is ordinarily the only codon for tryptophan) can be modified to yield a functionally identical molecule. Accordingly, each silent variation of a nucleic acid that encodes a polypeptide is implicit in each described sequence.

For polypeptide sequences, "conservatively modified variants" include individual substitutions, deletions or additions to a polypeptide sequence which result in the substitution of an amino acid with a chemically similar amino acid. Conservative substitution tables providing functionally similar amino acids are well known in the art. Such conservatively modified variants are in addition to and do not exclude polymorphic variants, interspecies homologs, and alleles of the invention. The following eight groups contain amino acids that are conservative substitutions for one another: 1) Alanine (A), Glycine (G); 2) Aspartic acid (D), Glutamic acid (E); 3) Asparagine (N), Glutamine (Q); 4) Arginine (R), Lysine (K); 5) Isoleucine (I), Leucine (L), Methionine (M), Valine (V); 6) Phenylalanine (F), Tyrosine (Y), Tryptophan (W); 7) Serine (S), Threonine (T); and 8) Cysteine (C), Methionine (M) (see, e.g., Creighton, Proteins (1984)). In some embodiments, the term "conservative sequence modifications" are used to refer to amino acid modifications that do not significantly affect or alter the binding characteristics of the antibody containing the amino acid sequence.

The terms "cross-compete" and "cross-competing" are used interchangeably herein to mean the ability of an antibody or other binding agent to interfere with the binding of other antibodies or binding agents to suPAR in a standard competitive binding assay.

The ability or extent to which an antibody or other binding agent is able to interfere with the binding of another antibody or binding molecule to suPAR, and therefore whether it can be said to cross-compete according to the invention, can be determined using standard competition binding assays. One suitable assay involves the use of the BIACORE™ technology (e.g. by using the BIACORE™ 3000 instrument (Biacore, Uppsala, Sweden)), which can measure the extent of interactions using surface plasmon resonance technology. Another assay for measuring cross-competing uses an ELISA-based approach.

The term "optimized" as used herein refers to a nucleotide sequence has been altered to encode an amino acid sequence using codons that are preferred in the production cell or organism, generally a eukaryotic cell, for example, a cell of *Pichia*, a cell of *Trichoderma*, a Chinese Hamster Ovary cell (CHO) or a human cell. The optimized nucleotide sequence is engineered to retain completely or as much as possible the amino acid sequence originally encoded by the starting nucleotide sequence, which is also known as the "parental" sequence.

Standard assays to evaluate the binding ability of the antibodies toward suPAR of various species are known in the art, including for example, ELISAs, western blots and RIAs. The binding kinetics (e.g., binding affinity) of the antibodies also can be assessed by standard assays known in the art, such as by BIACORE™ analysis, or FACS relative affinity (Scatchard). Assays to evaluate the effects of the antibodies on functional properties of suPAR known in the art may be used.

The terms "polypeptide" and "protein" are used interchangeably herein to refer to a polymer of amino acid residues. The terms apply to amino acid polymers in which one or more amino acid residue is an artificial chemical mimetic of a corresponding naturally occurring amino acid, as well as to naturally occurring amino acid polymers and non-naturally occurring amino acid polymer. Unless otherwise indicated, a particular polypeptide sequence also implicitly encompasses conservatively modified variants thereof.

The phrase "signal transduction" or "signaling activity" as used herein refers to a biochemical causal relationship generally initiated by a protein-protein interaction such as binding of a growth factor to a receptor, resulting in transmission of a signal from one portion of a cell to another portion of a cell.

The term "subject" includes human and non-human animals. Non-human animals include all vertebrates, e.g., mammals and non-mammals, such as non-human primates, sheep, dog, cow, chickens, amphibians, and reptiles. Except when noted, the terms "patient" or "subject" are used herein interchangeably.

"Measuring" or "measurement" means assessing the presence, absence, quantity or amount (which can be an effective amount) of a given substance within a sample, including the derivation of qualitative or quantitative concentration levels of such substances, or otherwise evaluating the values or categorization of a subject's clinical parameters. Alternatively, the term "detecting" or "detection" may be used and is understood to cover all measuring or measurement as described herein.

The terms "sample" or "biological sample" as used herein, refers to a sample of biological fluid, tissue, or cells, in a healthy and/or pathological state obtained from a subject. Such samples include, but are not limited to, blood, bronchial lavage fluid, sputum, saliva, urine, amniotic fluid, lymph fluid, tissue or fine needle biopsy samples, peritoneal fluid, cerebrospinal fluid, nipple aspirates, and includes supernatant from cell lysates, lysed cells, cellular extracts, and nuclear extracts. In some embodiments, the whole blood sample is further processed into serum or plasma samples.

"Treating", "treat", or "treatment" within the context of the instant invention, means an alleviation of symptoms associated with a disorder or disease, or halt of further progression or worsening of those symptoms, or prevention or prophylaxis of the disease or disorder.

The term "Acute Kidney Injury" (AKI) as used herein is defined based on the Kidney Disease: Improving Global Outcomes (KDIGO) Work Group criteria as a ≥0.3 mg/dl absolute increase in SCr within the first 48 hours post-procedure or ICU admission, a ≥50% relative increase in SCr within the first 7 days post-procedure or ICU admission, or need for dialysis.[29]

The term "Contrast-Induced Nephropathy" (CIN) as used herein is defined using Acute Kidney Injury Network definition for Stage 1 or greater injury and is a ≥0.3 mg/dL absolute decrease in creatinine after creatinine bump up to 60 days post contrast exposure.

The term "contrast agent", as used herein, refers to a type of medical contrast medium used to enhance the contrast of internal bodily structures, e.g., blood vessels and the gastrointestinal tract, in medical imaging thus improve the visibility of said structures in an X-ray or magnetic based imaging techniques such as computed tomography, magnetic resonance imaging, or radiography commonly known as X-ray imaging. Contrast agents are typically iodine or barium compounds. Commonly used iodinated contrast agents include, without being limited to, high osmolar, i.e., ionic, contrast agents such as diatrizoate (Hypaque™ 50), metrizoate (Isopaque™ 370) and iozaglate (Hexabrix™), and low osmolar, i.e., non-ionic, contrast agents such as iopamidol (Isovue™ 370), iohexyl (Omnipaque™ 350), ioxilan (Oxilan™ 350), iopromide (Ultravist™ 370) and iodixanol (Visipaque™ 320). A commonly used barium-based contrast agent is barium sulfate, mainly used in the imaging of the gastrointestinal tract.

As used herein, the phrase "cardiovascular intervention" means one or more invasive procedures affecting the cardiovascular system of a patient. Non-limiting examples are coronary angioplasty, including balloon angioplasty and coronary artery balloon dilation, percutaneous coronary intervention, laser angioplasty, atherectomy, coronary bypass graft surgery (CABG), valve repair, minimally invasive heart surgery including limited access coronary artery surgery, port-access coronary artery bypass (PACAB or PortCAB), and minimally invasive coronary artery bypass graft (MIDCAB), catheter ablation, transmyocardial revascularization, heart transplant, and artificial heart valve surgery.

As used herein, the phrase "imaging test" means, any modality of technology that provides a picture or assists in viewing of the body's interior, in whole or in part, including but not limited to common medical imaging technology such as: magnetic resonance imaging, computed tomography, nuclear medicine imaging, positron emission tomography, x-ray, and ultrasound.

suPAR Measurement

In some embodiments, a measurement of a subject's suPAR level is made. The suPAR measurement may be made at any time, for example before a medical procedure or after a medical procedure. In some embodiments, the medical procedure may be any medical procedure, including but not limited to a cardiovascular procedure with or without contrast being administered during the procedure. In some embodiments, the subject's suPAR level is made before a medical procedure. In some embodiments, the suPAR level is measured and compared to a control suPAR level. In some embodiments, the control suPAR level is less than about 3 ng/ml.

In some embodiments, the suPAR level may be measured from the subject's biological sample. Measurement of suPAR levels in the biological sample may be made using any method known to one skilled in the art. Methods for measuring suPAR levels include, but are not limited to Enzyme-linked immunosorbent assay (ELISA), Western blot, immunoprecipitation, immunohistochemistry, Radio Immuno Assay (RIA), radioreceptor assay, proteomics methods, mass-spec based detection (SRM or MRM) or quantitative immunostaining methods. Methods for measuring nucleic acid levels of suPAR may be any techniques known to one skilled in the art. In some embodiments, the suPAR level is measured by ELISA. For example, the ELISA may be a commercial ELISA, such as Virogates, Copenhagen, Denmark.

In some embodiments, the suPAR level determines whether or not an agent that antagonizes suPAR is administered to a subject. In some embodiments, when a suPAR level of about 3 ng/ml or greater is measures in the subject, an agent that antagonizes suPAR is administered to a subject. In some embodiments, the agent is an anti-suPAR antibody, an anti-uPAR antibody or antigen-binding fragment thereof that specifically binds to suPAR. In some embodiments, the anti-suPAR antibody is a commercially available anti-suPAR antibody or an antigen-binding fragment thereof that specifically binds to suPAR or an anti-uPAR antibody or antigen-binding fragment thereof that specifically binds to suPAR.

Pharmaceutical Compositions

To prepare pharmaceutical or sterile compositions including suPAR—binding antibodies (intact or binding fragments), the suPAR-binding antibodies (intact or binding fragments) is mixed with a pharmaceutically acceptable carrier or excipient. The compositions can additionally contain one or more other therapeutic agents that are suitable for treating or preventing low-grade serous ovarian cancer.

Formulations of therapeutic and diagnostic agents can be prepared by mixing with physiologically acceptable carriers, excipients, or stabilizers in the form of, e.g., lyophilized powders, slurries, aqueous solutions, lotions, or suspensions (see, e.g., Hardman et al., (2001) Goodman and Gilman's The Pharmacological Basis of Therapeutics, McGraw-Hill, New York, N.Y.; Gennaro (2000) Remington: The Science and Practice of Pharmacy, Lippincott, Williams, and Wilkins, New York, N.Y.; Avis, et al. (eds.) (1993) Pharmaceutical Dosage Forms: Parenteral Medications, Marcel Dekker, NY; Lieberman, et al. (eds.) (1990) Pharmaceutical Dosage Forms: Tablets, Marcel Dekker, NY; Lieberman, et al. (eds.) (1990) Pharmaceutical Dosage Forms: Disperse Systems, Marcel Dekker, NY; Weiner and Kotkoskie (2000) Excipient Toxicity and Safety, Marcel Dekker, Inc., New York, N.Y.).

Selecting an administration regimen for a therapeutic depends on several factors, including the serum or tissue turnover rate of the entity, the level of symptoms, the immunogenicity of the entity, and the accessibility of the target cells in the biological matrix. In certain embodiments, an administration regimen maximizes the amount of therapeutic delivered to the patient consistent with an acceptable level of side effects. Accordingly, the amount of biologic delivered depends in part on the particular entity and the severity of the condition being treated. Guidance in selecting appropriate doses of antibodies, cytokines, and small molecules are available (see, e.g., Wawrzynczak (1996) Antibody Therapy, Bios Scientific Pub. Ltd, Oxfordshire, UK; Kresina (ed.) (1991) Monoclonal Antibodies, Cytokines and Arthritis, Marcel Dekker, New York, N.Y.; Bach (ed.) (1993) Monoclonal Antibodies and Peptide Therapy in Autoimmune Diseases, Marcel Dekker, New York, N.Y.; Baert et al, (2003) New Engl. J. Med. 348:601-608; Milgrom et al, (1999) New Engl. J. Med. 341: 1966-1973; Slamon et al, (2001) New Engl. J. Med. 344:783-792; Beniaminovitz et al, (2000) New Engl. J. Med. 342:613-619; Ghosh et al, (2003) New Engl. J. Med. 348:24-32; Lipsky et al, (2000) New Engl. J. Med. 343: 1594-1602).

Determination of the appropriate dose is made by the clinician, e.g., using parameters or factors known or suspected in the art to affect treatment or predicted to affect treatment. Generally, the dose begins with an amount somewhat less than the optimum dose and it is increased by small increments thereafter until the desired or optimum effect is achieved relative to any negative side effects. Important diagnostic measures include those of symptoms of, e.g., the inflammation or level of inflammatory cytokines produced.

Actual dosage levels of the active ingredients in the pharmaceutical compositions of the present invention may be varied so as to obtain an amount of the active ingredient which is effective to achieve the desired therapeutic response for a particular patient, composition, and mode of administration, without being toxic to the patient. The selected dosage level will depend upon a variety of pharmacokinetic factors including the activity of the particular compositions of the present invention employed, or the ester, salt or amide thereof, the route of administration, the time of administration, the rate of excretion of the particular compound being employed, the duration of the treatment, other drugs, compounds and/or materials used in combination with the particular compositions employed, the age, sex, weight, condition, general health and prior medical history of the patient being treated, and like factors known in the medical arts. Compositions comprising antibodies or fragments thereof of the invention can be provided by continuous infusion, or by doses at intervals of, e.g., one day, one week, or 1-7 times per week. Doses may be provided intravenously, subcutaneously, topically, orally, nasally, rectally, intramuscular, intracerebrally, or by inhalation. A specific dose protocol is one involving the maximal dose or dose frequency that avoids significant undesirable side effects. A total weekly dose may be at least 0.05 μ/kg body weight, at least 0.2 μg/kg, at least 0.5 μg/kg, at least 1 μg/kg, at least 10 μg/kg, at least 100 μg/kg, at least 0.2 mg/kg, at least 1.0 mg/kg, at least 2.0 mg/kg, at least 10 mg/kg, at least 25 mg/kg, at least 30 mg/kg, at least 40 mg/kg or at least 50 mg/kg (see, e.g., Yang et al, (2003) New Engl. J. Med. 349:427-434; Herold et al, (2002) New Engl. J. Med. 346: 1692-1698; Liu et al, (1999) J. Neurol. Neurosurg. Psych. 67:451-456; Portielji et al, (2003) Cancer Immunol. Immunother. 52: 133-144). The desired dose of antibodies or fragments thereof is about the same as for an antibody or polypeptide, on a moles/kg body weight basis. The desired plasma concentration of the antibodies or fragments thereof is about, on a moles/kg body weight basis. The dose may be at least 15 μg at least 20 μg, at least 25 μg, at least 30 μg, at least 35 μg, at least 40 μg, at least 45 μg, at least 50 μg, at least 55 μg, at least 60 μg, at least 65 μg, at least 70 μg, at least 75 μg, at least 80 μg, at least 85 μg, at least 90 μg, at least 95 μg, or at least 100 μg. The doses administered to a subject may number at least 1, 2, 3, 4, 5, 6, 7, 8, 9, 10, 11, or 12, or more. For antibodies or fragments thereof of the invention, the dosage administered to a patient may be 0.0001 mg/kg to 100 mg/kg of the patient's body weight. The dosage may be between 0.0001 mg/kg and 20 mg/kg, 0.0001 mg/kg and 10 mg/kg, 0.0001 mg/kg and 5 mg/kg, 0.0001 and 2 mg/kg, 0.0001 and 1 mg/kg, 0.0001 mg/kg and 0.75 mg/kg, 0.0001 mg/kg and 0.5 mg/kg, 0.0001 mg/kg to 0.25 mg/kg, 0.0001 to 0.15 mg/kg, 0.0001 to 0.10 mg/kg, 0.001 to 0.5 mg/kg, 0.01 to 0.25 mg/kg or 0.01 to 0.10 mg/kg of the patient's body weight.

The dosage of the antibodies or fragments thereof of the invention may be calculated using the patient's weight in kilograms (kg) multiplied by the dose to be administered in mg/kg. The dosage of the antibodies or fragments thereof of the invention may be 150 μg/kg or less, 125 μg/kg or less, 100 μg/kg or less, 95 μg/kg or less, 90 μg/kg or less, 85 μg/kg or less, 80 μg/kg or less, 75 μg/kg or less, 70 μg/kg or less, 65 μg/kg or less, 60 μg/kg or less, 55 μg/kg or less, 50 μg/kg or less, 45 μg/kg or less, 40 μg/kg or less, 35 μg/kg or less, 30 μg/kg or less, 25 μg/kg or less, 20 μg/kg or less, 15 μg/kg or less, 10 μg/kg or less, 5 μg/kg or less, 2.5 μg/kg or less, 2 μg/kg or less, 1.5 μg/kg or less, 1 μg/kg or less, 0.5 μg/kg or less, or 0.5 μg/kg or less of a patient's body weight.

Unit dose of the antibodies or fragments thereof of the invention may be 0.1 mg to 20 mg, 0.1 mg to 15 mg, 0.1 mg to 12 mg, 0.1 mg to 10 mg, 0.1 mg to 8 mg, 0.1 mg to 7 mg, 0.1 mg to 5 mg, 0.1 to 2.5 mg, 0.25 mg to 60 mg, 0.25 mg to 40 mg, 0.25 mg to 20 mg, 0.25 to 15 mg, 0.25 to 12 mg, 0.25 to 10 mg, 0.25 to 8 mg, 0.25 mg to 7 mg, 0.25 mg to 5 mg, 0.5 mg to 2.5 mg, 1 mg to 20 mg, 1 mg to 15 mg, 1 mg to 12 mg, 1 mg to 10 mg, 1 mg to 8 mg, 1 mg to 7 mg, 1 mg to 5 mg, or 1 mg to 2.5 mg.

The dosage of the antibodies or fragments thereof of the invention may achieve a serum titer of at least 0.1 μg/ml, at least 0.5 μg/ml, at least 1 μg/ml, at least 2 μg/ml, at least 5 μg/ml, at least 6 μg/ml, at least 10 μg/ml, at least 15 μg/ml, at least 20 μg/ml, at least 25 μg/ml, at least 50 μg/ml, at least 100 μg/ml, at least 125 μg/ml, at least 150 μg/ml, at least 175 μg/ml, at least 200 μg/ml, at least 225 μg/ml, at least 250 μg/ml, at least 275 μg/ml, at least 300 μg/ml, at least 325 μg/ml, at least 350 μg/ml, at least 375 μg/ml, or at least 400 μg/ml in a subject. Alternatively, the dosage of the antibodies or fragments thereof of the invention may achieve a serum titer of at least 0.1 μg/ml, at least 0.5 μg/ml, at least 1 μg/ml, at least, 2 μg/ml, at least 5 μg/ml, at least 6 μg/ml, at least 10 μg/ml, at least 15 μg/ml, at least 20 .mu.g/ml, at least 25 μg/ml, at least 50 μg/ml, at least 100 μg/ml, at least 125 μg/ml, at least 150 μg/ml, at least 175 μg/ml, at least 200 μg/ml, at least 225 μg/ml, at least 250 μg/ml, at least 275 μg/ml, at least 300 μg/ml, at least 325 μg/ml, at least 350 μg/ml, at least 375 μg/ml, or at least 400 μg/ml in the subject.

Doses of antibodies or fragments thereof of the invention may be repeated and the administrations may be separated by at least 1 day, 2 days, 3 days, 5 days, 7 days, 10 days, 15 days, 30 days, 45 days, 2 months, 75 days, 3 months, or at least 6 months.

An effective amount for a particular patient may vary depending on factors such as the condition being treated, the overall health of the patient, the method route and dose of administration and the severity of side effects (see, e.g., Maynard et al., (1996) A Handbook of SOPs for Good Clinical Practice, Interpharm Press, Boca Raton, Fla.; Dent (2001) Good Laboratory and Good Clinical Practice, Urch PubL, London, UK).

The route of administration may be by, e.g., topical or cutaneous application, injection or infusion by intravenous, intraperitoneal, intracerebral, intramuscular, intraocular, intraarterial, intracerebrospinal, intralesional, or by sustained release systems or an implant (see, e.g., Sidman et al., (1983) Biopolymers 22:547-556; Langer et al., (1981) J. Biomed. Mater. Res. 15: 167-277; Langer (1982) Chem. Tech. 12:98-105; Epstein et al, (1985) Proc. Natl. Acad. Sci. USA 82:3688-3692; Hwang et al., (1980) Proc. Natl. Acad. Sci. USA 77:4030-4034; U.S. Pat. Nos. 6,350,466 and 6,316,024). Where necessary, the composition may also include a solubilizing agent and a local anesthetic such as lidocaine to ease pain at the site of the injection. In addition, pulmonary administration can also be employed, e.g., by use of an inhaler or nebulizer, and formulation with an aerosolizing agent. See, e.g., U.S. Pat. Nos. 6,019,968, 5,985,320, 5,985,309, 5,934,272, 5,874,064, 5,855,913, 5,290,540, and 4,880,078; and PCT Publication Nos. WO 92/19244, WO 97/32572, WO 97/44013, WO 98/31346, and WO 99/66903, each of which is incorporated herein by reference their entirety.

A composition of the present invention may also be administered via one or more routes of administration using one or more of a variety of methods known in the art. As will be appreciated by the skilled artisan, the route and/or mode of administration will vary depending upon the desired results. Selected routes of administration for antibodies or fragments thereof of the invention include intravenous, intramuscular, intradermal, intraperitoneal, subcutaneous, spinal or other parenteral routes of administration, for example by injection or infusion. Parenteral administration may represent modes of administration other than enteral and topical administration, usually by injection, and includes, without limitation, intravenous, intramuscular, intraarterial, intrathecal, intracapsular, intraorbital, intracardiac, intradermal, intraperitoneal, transtracheal, subcutaneous, subcuticular, intraarticular, subcapsular, subarachnoid, intraspinal, epidural and intrasternal injection and infusion. Alternatively, a composition of the invention can be administered via a non-parenteral route, such as a topical, epidermal or mucosal route of administration, for example, intranasally, orally, vaginally, rectally, sublingually or topically. In one embodiment, the antibodies or fragments thereof of the invention is administered by infusion. In another embodiment, the multispecific epitope binding protein of the invention is administered subcutaneously. If the antibodies or fragments thereof of the invention are administered in a controlled release or sustained release system, a pump may be used to achieve controlled or sustained release (see Langer, supra; Sefton, (1987) CRC Crit. Ref Biomed. Eng. 14:20; Buchwald et al., (1980), Surgery 88:507; Saudek et al, (1989) N. Engl. J. Med. 321:574). Polymeric materials can be used to achieve controlled or sustained release of the therapies of the invention (see e.g., Medical Applications of Controlled Release, Langer and Wise (eds.), CRC Pres., Boca Raton, Fla. (1974); Controlled Drug Bioavailability, Drug Product Design and Performance, Smolen and Ball (eds.), Wiley, New York (1984); Ranger and Peppas, (1983) J. Macromol. Sci. Rev. Macromol. Chem. 23:61; see also Levy et al., (1985) Science 228: 190; During et al, (1989) Ann. Neurol. 25:351; Howard et al, (1989) J. Neurosurg. 7 1:105); U.S. Pat. Nos. 5,679,377; 5,916,597; 5,912,015; 5,989,463; 5,128,326; PCT Publication No. WO 99/15154; and PCT Publication No. WO 99/20253. Examples of polymers used in sustained release formulations include, but are not limited to, poly(2-hydroxy ethyl methacrylate), poly (methyl methacrylate), poly(acrylic acid), poly(ethylene-co-vinyl acetate), poly(methacrylic acid), polyglycolides (PLG), polyanhydrides, poly(N-vinyl pyrrolidone), poly(vinyl alcohol), polyacrylamide, poly(ethylene glycol), polylactides (PLA), poly(lactide-co-glycolides) (PLGA), and polyorthoesters. In one embodiment, the polymer used in a sustained release formulation is inert, free of leachable impurities, stable on storage, sterile, and biodegradable. A controlled or sustained release system can be placed in proximity of the prophylactic or therapeutic target, thus requiring only a fraction of the systemic dose (see, e.g., Goodson, in Medical Applications of Controlled Release, supra, vol. 2, pp. 115-138 (1984)).

Controlled release systems are discussed in the review by Langer, (1990), Science 249: 1527-1533). Any technique known to one of skill in the art can be used to produce sustained release formulations comprising one or more antibodies or fragments thereof of the invention. See, e.g., U.S. Pat. No. 4,526,938, PCT publication WO 91/05548, PCT publication WO 96/20698, Ning et al, (1996), Radiotherapy & Oncology 39: 179-189, Song et al, (1995) PDA Journal of Pharmaceutical Science & Technology 50:372-397, Cleek et al., (1997) Pro. Int'l. Symp. Control. Rel. Bioact. Mater. 24:853-854, and Lam et al, (1997) Proc. Int'l. Symp. Control Rel. Bioact. Mater. 24:759-760, each of which is incorporated herein by reference in their entirety.

If the antibodies or fragments thereof of the invention are administered topically, they can be formulated in the form of an ointment, cream, transdermal patch, lotion, gel, shampoo, spray, aerosol, solution, emulsion, or other form well-known to one of skill in the art. See, e.g., Remington's Pharmaceutical Sciences and Introduction to Pharmaceutical Dosage Forms, 19th ed., Mack Pub. Co., Easton, Pa. (1995). For non-sprayable topical dosage forms, viscous to semi-solid or solid forms comprising a carrier or one or more excipients compatible with topical application and having a dynamic viscosity, in some instances, greater than water are typically employed. Suitable formulations include, without limitation, solutions, suspensions, emulsions, creams, ointments, powders, liniments, salves, and the like, which are, if desired, sterilized or mixed with auxiliary agents (e.g., preservatives, stabilizers, wetting agents, buffers, or salts) for influencing various properties, such as, for example, osmotic pressure. Other suitable topical dosage forms include sprayable aerosol preparations wherein the active ingredient, in some instances, in combination with a solid or liquid inert carrier, is packaged in a mixture with a pressurized volatile (e.g., a gaseous propellant, such as freon) or in a squeeze bottle. Moisturizers or humectants can also be added to pharmaceutical compositions and dosage forms if desired. Examples of such additional ingredients are well-known in the art.

If the compositions comprising antibodies or fragments thereof are administered intranasally, it can be formulated in an aerosol form, spray, mist or in the form of drops. In particular, prophylactic or therapeutic agents for use according to the present invention can be conveniently delivered in the form of an aerosol spray presentation from pressurized packs or a nebuliser, with the use of a suitable propellant (e.g., dichlorodifluoromethane, trichlorofluoromethane, dichlorotetrafluoroethane, carbon dioxide or other suitable gas). In the case of a pressurized aerosol the dosage unit may be determined by providing a valve to deliver a metered amount. Capsules and cartridges (composed of, e.g., gelatin) for use in an inhaler or insufflator may be formulated containing a powder mix of the compound and a suitable powder base such as lactose or starch.

Methods for co-administration or treatment with a second therapeutic agent, e.g., a cytokine, steroid, chemotherapeutic agent, antibiotic, or radiation, are known in the art (see, e.g., Hardman et al., (eds.) (2001) Goodman and Gilman's The Pharmacological Basis of Therapeutics, IO.sup.th ed., McGraw-Hill, New York, N.Y.; Poole and Peterson (eds.) (2001) Pharmacotherapeutics for Advanced Practice: A Practical Approach, Lippincott, Williams & Wilkins, Phila., Pa.; Chabner and Longo (eds.) (2001) Cancer Chemotherapy and Biotherapy, Lippincott, Williams & Wilkins, Phila., Pa.). An effective amount of therapeutic may decrease the symptoms by at least 10%; by at least 20%; at least about 30%>; at least 40%>, or at least 50%.

Additional therapies (e.g., prophylactic or therapeutic agents), which can be administered in combination with the antibodies or fragments thereof of the invention may be administered less than 5 minutes apart, less than 30 minutes apart, 1 hour apart, at about 1 hour apart, at about 1 to about 2 hours apart, at about 2 hours to about 3 hours apart, at about 3 hours to about 4 hours apart, at about 4 hours to about 5 hours apart, at about 5 hours to about 6 hours apart, at about 6 hours to about 7 hours apart, at about 7 hours to about 8 hours apart, at about 8 hours to about 9 hours apart, at about 9 hours to about 10 hours apart, at about 10 hours to about 11 hours apart, at about 11 hours to about 12 hours apart, at about 12 hours to 18 hours apart, 18 hours to 24 hours apart, 24 hours to 36 hours apart, 36 hours to 48 hours apart, 48 hours to 52 hours apart, 52 hours to 60 hours apart, 60 hours to 72 hours apart, 72 hours to 84 hours apart, 84 hours to 96 hours apart, or 96 hours to 120 hours apart from the antibodies or fragments thereof of the invention. The two or more therapies may be administered within one same patient visit.

The antibodies or fragments thereof of the invention and the other therapies may be cyclically administered. Cycling therapy involves the administration of a first therapy (e.g., a first prophylactic or therapeutic agent) for a period of time, followed by the administration of a second therapy (e.g., a second prophylactic or therapeutic agent) for a period of time, optionally, followed by the administration of a third therapy (e.g., prophylactic or therapeutic agent) for a period of time and so forth, and repeating this sequential administration, i.e., the cycle in order to reduce the development of resistance to one of the therapies, to avoid or reduce the side effects of one of the therapies, and/or to improve the efficacy of the therapies.

In certain embodiments, the antibodies or fragments thereof of the invention can be formulated to ensure proper distribution in vivo. For example, the blood-brain barrier (BBB) excludes many highly hydrophilic compounds. To ensure that the therapeutic compounds of the invention cross the BBB (if desired), they can be formulated, for example, in liposomes. For methods of manufacturing liposomes, see, e.g., U.S. Pat. Nos. 4,522,811; 5,374,548; and 5,399,331. The liposomes may comprise one or more moieties which are selectively transported into specific cells or organs, thus enhance targeted drug delivery (see, e.g., Ranade, (1989) J. Clin. Pharmacol. 29:685). Exemplary targeting moieties include folate or biotin (see, e.g., U.S. Pat. No. 5,416,016 to Low et al); mannosides (Umezawa et al, (1988) Biochem. Biophys. Res. Commun. 153: 1038); antibodies (Bloeman et al, (1995) FEBS Lett. 357: 140; Owais et al., (1995) Antimicrob. Agents Chemother. 39: 180); surfactant protein A receptor (Briscoe et al, (1995) Am. J. Physiol. 1233: 134); p 120 (Schreier et al, (1994) J. Biol. Chem. 269:9090); see also K. Keinanen; M. L. Laukkanen (1994) FEBS Lett. 346: 123; J. J. Killion; I. J. Fidler (1994) Immunomethods 4:273.

The invention provides protocols for the administration of pharmaceutical composition comprising antibodies or fragments thereof of the invention alone or in combination with other therapies to a subject in need thereof. The therapies (e.g., prophylactic or therapeutic agents) of the combination therapies of the present invention can be administered concomitantly or sequentially to a subject. The therapy (e.g., prophylactic or therapeutic agents) of the combination therapies of the present invention can also be cyclically administered. Cycling therapy involves the administration of a first therapy (e.g., a first prophylactic or therapeutic agent) for a period of time, followed by the administration of a second therapy (e.g., a second prophylactic or therapeutic agent) for a period of time and repeating this sequential administration, i.e., the cycle, in order to reduce the development of resistance to one of the therapies (e.g., agents) to avoid or reduce the side effects of one of the therapies (e.g., agents), and/or to improve, the efficacy of the therapies.

The therapies (e.g., prophylactic or therapeutic agents) of the combination therapies of the invention can be administered to a subject concurrently. The term "concurrently" is not limited to the administration of therapies (e.g., prophylactic or therapeutic agents) at exactly the same time, but rather it is meant that a pharmaceutical composition comprising antibodies or fragments thereof of the invention are administered to a subject in a sequence and within a time interval such that the antibodies of the invention can act together with the other therapy(ies) to provide an increased benefit than if they were administered otherwise. For example, each therapy may be administered to a subject at the same time or sequentially in any order at different points in time; however, if not administered at the same time, they should be administered sufficiently close in time so as to provide the desired therapeutic or prophylactic effect. Each therapy can be administered to a subject separately, in any appropriate form and by any suitable route. In various embodiments, the therapies (e.g., prophylactic or therapeutic agents) are administered to a subject less than 15 minutes, less than 30 minutes, less than 1 hour apart, at about 1 hour apart, at about 1 hour to about 2 hours apart, at about 2 hours to about 3 hours apart, at about 3 hours to about 4 hours apart, at about 4 hours to about 5 hours apart, at about 5 hours to about 6 hours apart, at about 6 hours to about 7 hours apart, at about 7 hours to about 8 hours apart, at about 8 hours to about 9 hours apart, at about 9 hours to about 10 hours apart, at about 10 hours to about 11 hours apart, at about 11 hours to about 12 hours apart, 24 hours apart, 48 hours apart, 72 hours apart, or 1 week apart. In other embodiments, two or more therapies (e.g., prophylactic or therapeutic agents) are administered to a within the same patient visit.

The prophylactic or therapeutic agents of the combination therapies can be administered to a subject in the same pharmaceutical composition. Alternatively, the prophylactic or therapeutic agents of the combination therapies can be administered concurrently to a subject in separate pharmaceutical compositions. The prophylactic or therapeutic agents may be administered to a subject by the same or different routes of administration. The invention having been fully described, it is further illustrated by the following examples and claims, which are illustrative and are not meant to be further limiting.

Example 1: suPAR as a Therapeutic Target in Acute Kidney Injury

Methods

SuPAR and Acute Kidney Injury

The association between suPAR levels and post-procedural AKI was evaluated in two prospective cohorts of patients undergoing coronary angiography for suspected coronary artery disease (total n=3827); the Emory Cardiovascular Biobank (EmCAB, n=2752) and the Catheter Sampled Blood Archive in Cardiovascular Diseases (CASABLANCA) (n=1075). To determine whether suPAR was associated with non-contrast AKI, findings in 250 patients at high risk of AKI undergoing cardiac surgery, and 692 critically ill patients admitted to the intensive care unit were used to replicate the coronary angiography cohorts (Table 4 and 5).[25-27]

Coronary Angiography Cohorts

Both EmCAB and CASABLANCA are prospective observational cohorts of adult (>18 years) patients undergoing coronary angiography for suspected ischemic heart disease.[25, 26] EmCAB enrolled patients at three Emory Healthcare sites in Atlanta, GA between 2003 and 2015, while CASABLANCA enrolled patients at the Massachusetts General Hospital in Boston, MA between 2008 and 2011. EmCAB excluded patients congenital heart disease, severe anemia, recent blood transfusion, myocarditis, history of active inflammatory disease or cancer. The only exclusion criterion in CASABLANCA was the unwillingness to participate. Participants without end-stage kidney disease who had a baseline and at least one post-angiography serum creatinine (SCr)-based measurement of kidney function within 7 days of the procedure were included in this analysis. Blood samples were collected pre-contrast injection at the time of vascular access. Both studies were approved by the Institutional Review Board at the respective institutions, and all participants provided written informed consent at the time of enrollment.

Description of Cardiac Surgery and ICU Cohorts suPAR was measured in 250 adult patients at high risk of AKI who underwent cardiac surgery at Brigham and Women's Hospital (Boston, MA) between August 2007 and March 2012. Inclusion criteria were baseline estimated glomerular filtration rate (eGFR)≤30 ml/min/1.73 $m^2$ or any two of the following: baseline eGFR 31-60 ml/min/1.73 $m^2$; diabetes mellitus; left ventricular ejection fraction ≤40%; previous cardiac surgery; combined coronary artery bypass or valve procedure; urgent procedure; and preoperative intra-aortic balloon pump. Exclusion criteria were preoperative AKI; recent aminoglycoside use; baseline SCr>4.5 mg/dL; end stage kidney disease receiving renal replacement therapy; renal transplantation; and pregnancy. Lastly, we measured suPAR in 692 patients admitted to intensive care units (ICUs) at Brigham and Women's Hospital (Boston, MA) between 2008 and 2019. Plasma samples were collected within 72 hours of arrival to the ICU. Patients with anticipated ICU stays <24 hours and those receiving dialysis were excluded. All patients or surrogates provided written informed consent, and all protocols were approved by our hospital's Institutional Review Board.

Measurement of Kidney Function and Definition of AKI

Serum creatinine (SCr) measurements at enrollment and all subsequent values acquired during the index hospitalization were obtained from electronic medical records. eGFR was calculated using the CKD-EPI equation.[28] AKI was defined based on the Kidney Disease: Improving Global Outcomes (KDIGO) Work Group criteria as a ≥0.3 mg/dl absolute increase in SCr within the first 48 hours post-procedure or ICU admission, a ≥50% relative increase in SCr within the first 7 days post-procedure or ICU admission, or need for dialysis.[29] The immediate pre-procedural or admission to ICU SCr level was used as the baseline value for all analyses.

Sample Collection and Measurement of suPAR

Blood samples were collected as described, and EDTA-plasma stored at −80° C. SuPAR was measured in plasma by experienced technicians blinded to the clinical data using a commercially available enzyme-linked immunosorbent assay (ELISA; Virogates, Copenhagen, Denmark). The lower limit of detection (LLOD) was 100 µg/mL. The inter-assay coefficient of variation (CV), determined using blinded replicate samples from study patients, was 10.9%. We and others have shown that suPAR levels are stable in stored plasma and serum samples, and that levels are reproducible in samples stored for more than 5 years at −80° C. despite exposure to multiple freeze-thaw cycles.[14, 30]

An Animal Model of AKI

Transgenic mice were generated over-expressing full length suPAR from adipose tissue and released into circulation,[17] and used an animal model of contrast nephropathy to ascertain whether elevated suPAR levels contributes to a greater susceptibility to AKI versus being a non-specific marker of immune activation or pre-existing CKD. Iohexol was injected intraperitoneally in transgenic C57BL/6J mice overexpressing suPAR (suPAR-Tg) and in wild-type (Wt) controls following published protocols.[31] The mice were also randomized to an intraperitoneal injection of either monoclonal uPAR antibody or the same concentration of IgG isotype to determine whether blocking suPAR could attenuate the severity of iohexol-induced AKI. The study was approved by the Institutional Animal Care and Use Committee (IACUC) of Rush University.

Inducing AKI in Mice

In brief, 10-week-old suPAR-Tg (n=20, 9 males) and Wt mice (n=16, 8 males) were denied free oral water access for 72 hours before receiving intraperitoneal NG-nitro-L-arginine methyl ester (L-NAME, 10 mg/kg, Sigma), a nitric oxide synthase inhibitor, and indomethacin (10 mg/kg, Sigma), an inhibitor of prostaglandin synthesis.[32] Thirty minutes after L-NAME and indomethacin injection, iohexol (Omnipaque™, 350 mg iodine/ml), a non-ionic low osmotic contrast medium, was administered intraperitoneally (5 g iodine/kg, TCI America). Urine and blood samples were collected 6 and 24 hours after iohexol injection. Mice were sacrificed at 48 hours post-iohexol injection, and the kidneys were examined for histologic investigation.

SuPAR-Tg and Wt mice were pre-treated with either a uPAR monoclonal antibody (uPAR Ab, 500 micrograms/kg, R&D Systems, catalog #MAB531) previously shown to inhibit suPAR-induced proteinuria,[14, 16] or the same amount of IgG isotype. Both reagents were administered intraperitoneally at 72, 24, and 1 hour before iohexol injection.

Assessment of AKI in Mice

Mouse serum suPAR levels were measured with the uPAR Duoset™ Elisa kit (R&D Systems). The intra- and inter-assay CVs were 5.6% and 5.5%, respectively. Serum creatinine and kidney histology were used to assess the severity of AKI. SCr was measured via an enzymatic reaction-based assay kit (MAK079, Sigma). Kidney histology and injury scoring was performed at the University of Illinois at Chicago, Research Histology and Tissue Imaging Core Facility as follows: kidney tissue was embedded in paraffin and cut at 4 µm. The sections were then processed for hematoxylin and eosin and Periodic Acid-Schiff staining. The slides were viewed by a pathologist blinded to the study design and mouse status, and the severity of AKI in each case was classified using a semi-quantitative kidney injury score ranging from 1 (minor, or local injury) to 4 (severe, diffuse injury) that incorporates glomerular and tubular changes (vacuolization, tubular necrosis, cast).[33]

Impact of SuPAR on Kidney Tubular Cell Bioenergetics

Given the established role of oxidative stress and mitochondrial dysfunction in the pathogenesis of AKI, the generation of reactive oxygen species and cellular bioenergetics of human kidney proximal tubular cells (HK-2) exposed to recombinant suPAR was quantified. The experiments were performed in the presence and absence of anti-uPAR monoclonal antibody (human uPAR antibody, catalog #MAB807 from R&D Systems) to determine whether blocking suPAR's interaction with tubular cells would abrogate changes in bioenergetics.

Mitochondrial Reactive Oxygen Species

HK-2 cells were exposed to either 1) media alone as control; 2) recombinant suPAR (10 ng/mL); 3) pre-treatment with uPAR antibody (50 ng/mL) for 30 min, followed by addition of recombinant suPAR (10 ng/mL); or 4) uPAR antibody (50 ng/mL) alone. Following treatment for 2 h or 24 h, cells were rinsed with warm PBS then incubated with 5 uM MitoSOX™ red reagent (Invitrogen) for 10 minutes at 37° C. Generation of mitochondria-specific superoxide induces fluorescence in the presence of MitoSOX™, which was quantified and compared among samples.[34]

Extracellular Flux Analysis

The Seahorse Extracellular Flux™ (XF24) Analyzer (Agilent) was used to measure in real time the oxygen consumption rates (OCR) of human kidney proximal tubular cells (HK-2).[35] In brief, HK-2 cells were treated with 10 ng/ml human recombinant uPAR protein (R&D Systems, 807-UK/CF™) and 50 ng/ml uPAR antibody (R&D Systems, MAB807™) either alone or in combination for 24 hours. Cellular respiration was measured under basal conditions and after the injection of oligomycin (1.0 µM), FCCP (1.25 µM), antimycin A (0.5 µM) and rotenone (0.5 µM).

Three readings were recorded after each injection over 24 min period. Mitochondrial ATP production-dependent OCR was calculated as the decrease in basal OCR after the addition of ATP synthase blocker, oligomycin. Maximal mitochondrial respiration was measured as the increase in the OCR after the addition of mitochondrial un-coupler carbonyl cyanide 4-trifluoromethoxy-phenylhydrazone (FCCP). Reserve respiratory capacity was calculated as the difference between the basal OCR reading and the OCR value after FCCP addition. OCR level after complex I inhibitor rotenone complex III blocker antimycin A injection is attributable to non-mitochondrial respiration since those inhibitors completely inhibit mitochondrial respiration. The residual mitochondrial respiration after oligomycin addition is due to proton leak.

Statistical Analysis

Continuous variables are presented as means (±standard deviation [SD]) or as median ($25^{th}$ to $75^{th}$ interquartile range) for normally and non-normally distributed data, respectively. Categorical variables are presented as proportions (%). To compare patients across suPAR quartiles, we used ANOVA, or Kruskal Wallis for continuous variables, and chi-square tests for categorical variables. Logistic regression was used to characterize the association between suPAR levels and AKI as a primary outcome, and AKI or death at 90 days as a secondary outcome. suPAR levels were assessed both as a continuous variable (natural log-transformed) and as quartiles, with the lowest quartile serving as the reference group. We adjusted for covariates using three models: in all cohorts, model 1 was unadjusted. In the coronary angiography cohorts; model 2 was adjusted for age, gender, race, smoking history, diabetes mellitus, congestive heart failure, hypertension; and model 3 incorporated the aforementioned variables in addition to acute myocardial infarction, revascularization, contrast volume and baseline eGFR. In the cardiac surgery cohort: model 2 was adjusted for age, gender, race, smoking history, diabetes mellitus, congestive heart failure, hypertension; and model 3 incorporated the aforementioned variables in addition to urgent procedure and cardiopulmonary bypass time. In the ICU cohort, model 2 was adjusted for age, gender, race, baseline eGFR, diabetes mellitus, congestive heart failure, chronic lung disease, and chronic liver disease, and model 3 was further adjusted for vasopressors received during the first 24 h of ICU admission, mechanical ventilation during the first 24 h of ICU admission, and the hemoglobin and white blood cell count on ICU admission. To investigate the possibility of effect modification attributed to differences in baseline characteristics, we computed odds ratios for the association between suPAR levels and AKI in relevant subgroups and performed tests of interaction. Finally, the area under the curve (AUC) was calculated to assess the incremental value of adding suPAR to the Simplified Integer Risk Score for Calculating the Risk of AKI, a validated clinical score derived from the National Cardiovascular Data Registry (NCDR) used to predict risk of contrast-induced nephropathy which includes age, pre-procedural eGFR, prior stroke, prior heart failure, prior PCI, presentation (non-ACS versus NSTEMI versus STEMI), diabetes, chronic lung disease, hypertension, cardiac arrest, anemia, heart failure on presentation, balloon pump use, and cardiogenic shock.[36]

For the animal experiments, a two-way ANOVA and post-hoc tests (LSD) were used to compare SCr and kidney injury scores between suPAR-Tg and Wt mice, and between those which received IgG isotype and uPAR monoclonal antibodies. Two-tailed P-values≤0.05 were considered significant. All analyses were performed using SPSS 24™ (IBM, NY, USA).

Results

Baseline Characteristics and Determinants of AKI

A total of 318 (8.3%) of patients developed post-procedural AKI, with a mean rise in SCr of 0.44 mg/dl (SD±0.54) compared to a mean rise of 0.01 mg/dL (SD±0.22) for those without AKI (P<0.001). The majority of AKI was mild (98% KDIGO stage 1), with only 28 patients having KDIGO stage 2 AKI, and 3 patients with stage 3 AKI within 7 days of angiography. Patients with post-coronary angiography AKI were more likely to be older, have diabetes mellitus, heart failure, lower baseline eGFR, received lower contrast volume, and were less likely to have undergone percutaneous coronary intervention at the time of angiography (Table 1).

In multivariable analysis, only diabetes mellitus, heart failure, lower eGFR and suPAR levels were independently associated with AKI (Table 2).

SuPAR and AKI

Characteristics of patients stratified by suPAR quartiles are shown in Table 3. Post-coronary angiography, the incidence of AKI was 14% and 4% in the highest (≥4184 µg/ml) and lowest (<2475 µg/ml) suPAR quartiles, respectively, an unadjusted 3.8-fold increase in odds of AKI (FIG. 1A). The association between suPAR and post-procedural AKI persisted despite adjustment for clinical characteristics (model 2) including contrast volume and baseline kidney function (model 3), with an adjusted odds ratio of 2.66, 95% CI (3.99-1.77) for AKI. Results remained consistent when examining suPAR as a continuous variable (per natural log), with adjusted OR 2.10, 95% CI (1.54-2.87). SuPAR was also strongly associated with the combined outcome of AKI or all-cause death at 90 days, with an adjusted odds ratio of and 3.30, 95% CI(2.34-4.74) (Table 2). In subgroup and sensitivity analyses the ORs for AKI risk remained consistent across relevant subgroups, including each cohort separately (FIG. 1B). We otherwise did note a stronger association between suPAR and AKI in patients who underwent revascularization (P=0.03 for interaction) (FIG. 1B).

Lastly, we examined the incremental value of adding suPAR to the NCDR's Simplified Integer Risk Score in predicting contrast-induced AKI.[36] The AUC for the NCDR risk score was 0.579, 95% CI(0.560-0.597). Addition of suPAR to the NCDR score improved the AUC to 0.628, 95% CI(0.610-0.647), with a ΔAUC of 0.050, 95% CI (0.013-0.087).

Cardiac Surgery and ICU Cohorts

Clinical characteristics of both surgical and ICU patients are listed in Table 1. Amongst 250 patients who underwent cardiac surgery, the incidence of AKI was 40% and 16% in the highest (≥5100 µg/ml) and lowest quartiles (<2860 µg/ml) of suPAR respectively (Table 4). Similarly, the incidence of AKI in 692 patients admitted to the ICU was 53% and 15% in the highest (≥9440 µg/ml) and lowest quartiles (<5150 µg/ml) of suPAR (Table 5). Among surgical patients, 67 (27%) developed AKI postoperatively, of those, 14 (6%) had severe (stage 2 or 3) AKI, and 8 (3%) required initiation of RRT (FIG. 5). In both cohorts the risk of AKI rose steadily with increasing suPAR quartiles, with a 3.5 to 4-fold increase in the risk of AKI in the highest versus lowest suPAR quartile (FIG. 2). The association between suPAR and AKI was only minimally attenuated in multivariable analyses, and did not differ between subgroups (FIG. 2).

SuPAR Overexpression Worsens AKI in Experimental Models

Prior to iohexol injection, baseline kidney function and histology were similar between Wt and suPAR-Tg mice at 10 weeks of age (FIG. 3A-B, G), despite higher suPAR levels in transgenics (210.2 ng/ml (SD 56) vs. 2.1 ng/ml (SD 0.97), P<0.001). At 24-hours post-contrast injection, both Wt and suPAR-Tg mice exhibited a rise in SCr. However, suPAR-Tg mice had significantly higher SCr (FIG. 3G) and more severe histopathologic features of AKI (FIG. 3D, H) compared to their Wt counterparts who had received IgG isotype (FIG. 3D, H).

Pre-Treatment with Monoclonal uPAR Antibody Attenuates AKI

Mice pre-treated with uPAR monoclonal antibodies had lower SCr at 24 hours compared to their counterparts that received IgG isotype (FIG. 3G). Mice pre-treated with uPAR monoclonal antibodies had lower suPAR at 24 hours and 48 hours and a smaller change from baseline for Kidney Injury Molecule-1 (KIM-1) at both 24 and 48 hours compared to their counterparts that received IgG isotype (FIG. 7) When comparing the renal histopathology of both Wt and suPAR-Tg mice, we found that at baseline both groups had largely normal histology (FIG. 3A, 3B). At 48-hours post-iohexol administration, all mice developed histologic features typical of contrast-induced AKI, including tubular vacuolization, tubular necrosis, and casts (FIG. 3C-3F). SuPAR-Tg pretreated with uPAR monoclonal antibodies showed milder histopathologic features of AKI and had lower kidney injury scores compared to the IgG isotype-treated animals (FIG. 3D, 3F). Taken together, these results suggest that high levels of circulating suPAR augment the severity of contrast-induced AKI, whereas blocking suPAR attenuates its severity.

Impact of SuPAR on the Bioenergetic Profile and Oxidative Stress of Human Kidney Proximal Tubular Cells We cultured HK-2 cells (FIG. 4) and podocytes (FIG. 6) and treated them with human recombinant suPAR protein (10 ng/ml) for 24 hours. HK-2 cells exposed to suPAR, compared to media alone have significantly higher energetic demand under baseline conditions (FIG. 4A), increased mitochondrial ATP production (FIG. 4C), with significantly higher maximum rate of respiration (FIG. 4D) and spare respiratory capacity (FIG. 4E). The suPAR-treated cells have also a higher levels of non-mitochondrial oxygen consumption rates, indicating an active involvement of other cellular oxygen consuming reactions in addition to that catalyzed by the mitochondrial cytochrome c oxidase (FIG. 4F). The OCRs attributed to proton leak across the mitochondrial membrane did not differ, indicating that mitochondria were not damaged by suPAR and the mitochondrial integrity is maintained after suPAR treatment (FIG. 4D). These effects were not seen in podocytes exposed to suPAR (FIG. 6). Super oxide generation was increased two-fold in the presence of suPAR; an effect that was completely abrogated by co-exposure to uPAR antibody (FIGS. 4H-I). These effects are attenuated when uPAR antibody is co-administered with suPAR (FIG. 4).

DISCUSSION

This study unravels suPAR as a risk factor for AKI in several cohorts totaling 4769 patients who were either exposed to intra-arterial contrast, underwent cardiac surgery or were critically ill. Concurrently we provide evidence of suPAR as a pathogenic factor for AKI, sensitizing kidney proximal tubules to injury through modulation of cellular bioenergetics and increased oxidative stress. Inhibiting suPAR using a monoclonal antibody attenuated the impact of iohexol on kidney function in mice overexpressing suPAR and abrogated bioenergetics changes in suPAR-exposed proximal kidney tubular cells. These studies provide an impetus to study interventions to alter suPAR levels as a therapeutic strategy for prevention of AKI in humans.

There has been little progress in the overall prevention and treatment of AKI, with mortality attributed to AKI reaching up to 50% depending on the clinical setting, an alarming statistic that has unfortunately remained relatively stable over the past 50 years.[37] Therapies aimed at prevention of contrast-induced AKI have also remained unchanged since the 1960s, relying on intravenous saline hydration, acetylcysteine, and sodium bicarbonate with little success.[27,38] Similarly, various interventions ranging from steroids to off-pump surgery have been investigated to minimize the risk of AKI following cardiac surgery, and these have mostly been met with negative or, at best, mixed results.[39-41] Biomarkers currently under study such as cystatin-C, neutrophil gelatinase-associated lipocalin, and kidney injury molecule-1 are early markers of AKI, that rise only after renal injury has occurred.[42,43] We found that suPAR is predictive of AKI pre-procedurally, in both low and high risk cohorts and across subgroups, independently of relevant clinical characteristics including baseline kidney function. In addition, suPAR improved risk discrimination when added to the NCDR Simple Integer Risk Score for AKI. Findings are in line with one previous smaller study of 107 patients who underwent cardiac surgery.[44] Improved assessment of the pre-procedural risk of AKI would allow for more informed decision-making, and most importantly identify a subset of patients that would benefit from an intervention to minimize procedural AKI, potentially in the form of anti-suPAR therapies.

Given the association between high suPAR levels and kidney dysfunction across a wide spectrum of clinical settings—including post-angiography, cardiac surgery, in connection with imaging tests, and the ICU, as shown here—the underlying pathophysiology by which elevated levels of suPAR affect the risk of AKI appears to be independent of the specific type of insult. Based on our animal models, we speculate that there may be a synergistic effect between suPAR—which acts as a metabolic sensitizer and increases the workload of tubular cells—and various insults such as ischemia, cytotoxicity, and oxidative stress induced by cardiac surgery or iodinated radiocontrast.[39,45] In response to suPAR treatment, we found that tubular epithelial cells, but not podocytes, exhibited increased mitochondrial respiration (basal, and capacity for ATP generation). Extramitochondrial oxygen consumption was increased in both cells by suPAR, but to a greater degree in epithelial cells, suggesting activation of extramitochondrial enzymatic oxidation. Pre-contrast injection, we found no histopathologic or biochemical measures of renal dysfunction in 10-week-old mice over-expressing suPAR. Following contrast administration, suPAR transgenics developed significantly more severe AKI compared to Wt mice. The impact of contrast administration on kidney injury in suPAR-Tg mice was attenuated with a monoclonal inhibitory antibody to uPAR, suggesting (a) chronically elevated suPAR levels sensitize the kidney to acute insults, and (b) this sensitizing effect of suPAR can be reversed pharmacologically. These conclusions are in line with a recent report showing that targeting the urokinase receptor in a diabetic kidney disease model in rats resulted in improvement in kidney function.[46] While studies on the mechanisms of suPAR in kidney dysfunction have focused on its role in binding and activating podocyte $\alpha v\beta 3$ integrins, other reports have also suggested suPAR to be affected proximal tubules in an integrin dependent manner driving kidney fibrosis.[14,16,17,47] It is plausible that prolonged suPAR exposure impacts podocytes and tubular cells via different mechanisms, as the bioenergetics changes seen in proximal tubular cells were not seen in podocytes treated with suPAR.

In conclusion, suPAR levels represent a potentially modifiable risk factor for AKI and a novel therapeutic target.

Example 2: suPAR Levels and Incidence of Contrast-Induced Nephropathy

Methods

Study Design and Population

SuPAR levels were measured in adults ≥18 years enrolled in the Emory Cardiovascular Biobank, a prospective cohort of patients undergoing left heart catheterization for suspected or confirmed CAD at three Emory Healthcare sites in Atlanta, GA, between 2003 and 2015. Participants were interviewed to collect demographic characteristics, medical history, medication use, and behavioral habits as previously described.[26,67] We excluded patients with end-stage renal disease on renal replacement therapy, patients with hemodynamic instability, or severe anemia. The study was approved by the institutional review board at Emory University (Atlanta, GA). All subjects provided written informed consent at the time of enrollment.

Defining Contrast-Induced Nephropathy

Using Acute Kidney Injury Network definition for Stage 1 or greater injury, we defined CIN as a ≥0.3 mg/dL absolute or 50% relative increase in post-angiography creatinine or new initiation of dialysis. Recovery after CIN was defined as ≥0.3 mg/dL absolute decrease in creatinine after creatinine bump up to 60 days post contrast exposure.

Follow-Up and Outcomes

Follow-up was conducted as previously described for the primary outcome of all-cause death identified by personnel blinded to the SuPAR data by phone, electronic medical record review, as well as and social security death index and state records. Secondary outcome included development of chronic kidney disease (eGFR <60 ml per minute per 1.73 m2 of body-surface area).

Measurement of suPAR

Fasting arterial blood samples were collected at the time of catheterization and stored at −80° C. Plasma levels of suPAR were measured (suPARnostic™ kit ViroGates, Copenhagen, Denmark) with a lower detection limit of 100 μg/mL and intra- and inter-assay variation of 2.75% and 9.17%, respectively[13]. Serum high-sensitivity C-reactive protein (CRP) levels were determined in 1805 patients using a particle-enhanced immunoturbidimetry assay (FirstMark, a division of GenWay Biotech) that has a lower limit of detection of 0.03 mg per liter[68].

Statistical Analysis

We reported subject characteristics as descriptive statistics with means, standard deviations, frequency counts, percentages, medians, and interquartile ranges. Differences between groups were assessed using the t-test for continuous variables, and chi-square for categorical variables. Two-tailed P-value ≤50.05 were considered statistically significant. For non-normally distributed variables such as suPAR and CRP levels, the Mann-Whitney U test was used to compare groups in unadjusted analyses. For multivariable analyses, suPAR levels were examined both as a categorical variable stratified by tertiles, and as a continuous variable after log-transforming, and reported as "per 100% higher suPAR levels". Covariates incorporated in multivariable analyses included age, gender, race, body mass index (BMI), smoking history, hypertension, diabetes, estimated glomerular filtration rate (eGFR calculated using the CKD-EPI equation), presence of obstructive CAD, heart failure, hemoglobin levels, suPAR and hs-CRP levels when available. Logistic regression was performed to investigate independent predictors of CIN. The Kaplan-Meier curves as well as Cox proportional-hazards regression model were used to examine the association between CIN and suPAR and all-cause death and incident CKD. Analysis was conducted using available data (3% with missing data) under the assumption of missing completely at random. Lastly, we examined the incremental value of adding suPAR to a validated clinical model (using the Simplified Integer Risk Score for Calculating the Risk of AKI derived from National Cardiovascular Data Registry) for predicting CIN using the c-statistics. Analyses were performed using IBM SPSS™ Statistics Version 22, (Armonk, NY, USA).

Results

Characteristics of the 2,768 enrolled patients who also had assessment of their renal function following angiography are shown in Table 6. Their mean age was 65 (±12) years, 67% were male and 50% had CAD (>=50% luminal stenosis). The median Simplified Integer Risk Score in our cohort was 15 (IQR 10-21).

SuPAR and Contrast-Induced Nephropathy

Patients developing CIN (n=176, 6.4%) were more likely to be have a history of diabetes, heart failure with lower ejection fraction, history of CABG, lower hemoglobin concentration, and worse renal function and higher Simplified Integer Risk Score (Table 6). Plasma suPAR levels were 21.4% higher [median of 3633 interquartile range IQR (2708-4964)] in patients with CIN compared to those without [2993 µg/mL IQR (2329-3938), P<0.001]. The incidence of CIN in those with suPAR in the lowest tertile was 3.3% compared to 6.3% and 9.5% in those with suPAR levels in the middle and highest tertiles (P<0.001).

In unadjusted analysis, a doubling in suPAR level was associated with a 2.0-fold (95% CI 1.58-2.51) P<0.001 greater odds for developing CIN. In multivariable analyses that included age, sex, black race, body mass index, diabetes, hypertension, hyperlipidemia, estimated GFR at baseline, obstructive CAD, history of heart failure and acute ST-elevation MI, independent predictors for CIN included worse eGFR, heart failure, acute ST-elevation MI and plasma suPAR level (Table 7). Simplified Integer Risk Score (includes age, heart failure, GFR, history of cardiovascular disease, unstable angina, non-ST elevation myocardial infarction, ST-elevation myocardial infarction, anemia, and cardiogenic shock) was significant predictor of CIN (OR for each 5 points higher=1.19, 95% CI 1.10-1.29, P<0.001). For each doubling of suPAR level, the adjusted OR of CIN was 1.85 (1.40-2.45) P<0.001. Patients with suPAR levels in the highest vs. lowest tertile had a 2.85-fold higher odds of CIN (95% CI 1.77-4.59, P<0.001). In a subset of patients who had hs-CRP levels measured (n=1792), there was no association between hs-CRP levels and CIN (OR=1.06, 95% CI 0.95-1.18, P=0.3) after multivariate adjustment, whereas suPAR (log 2) remained an independent predictor of CIN after adjustment for hs-CRP level (OR 1.79, 95% CI 1.24-2.6) and contrast volume (OR=2.29, 95% CI 1.49-3.50, P<0.001). Similar results obtained adjusting for the Simplified Integer Risk Score (suPAR log 2 OR=1.79, 95% CI 1.39-2.31, P<0.0001).

In sensitivity analyses, we found no significant heterogeneity in the OR for CIN based on age, gender, race, and presence of individual risk factors including smoking, diabetes, hypertension, hyperlipidemia, heart failure, baseline renal function or conservative vs. invasive management.

In those with CIN, suPAR levels correlated with the peak increase in creatinine (Rho=0.31 P<0.0001). Median creatinine increase in those with suPAR in the lowest tertile was 0.32 (IQR 0.3-0.5) compared to median increase of 0.5 (IQR 0.4-0.7) in those with suPAR in the highest tertile (P<0.001 for comparison). Overall, 61% of subjects had repeat creatinine measurements up to 60 days (median 27 days, IQR 13-44). About one third (35%) of those who developed CIN didn't recover (recovery defined as ≥0.3 mg/dL absolute decrease in creatinine after peak creatinine bump) and three patients developed end-stage renal disease requiring renal replacement therapy. SuPAR levels were not statistically different in those who did or didn't recover (P=0.5).

Risk Prediction Performance

We tested the incremental value of adding suPAR level to a model with significant traditional risk factors and clinical characteristics (including age, gender, race, body mass index, smoking history, hypertension, diabetes, hyperlipidemia, estimated glomerular filtration rate, history heart failure, and obstructive CAD) in predicting incident CIN. Addition of suPAR significantly improved the C-statistic (from 0.626 to 0.657, Δ=0.031, P=0.017). Similarly, we tested the incremental value of adding suPAR to the Simplified Integer Risk Score derived from National Cardiovascular Data Registry which showed similar improvement in C-statistic (from 0.580 to 0.630, Δ=0.050, P=0.009).

suPAR and Outcomes in CIN

Figure 9:
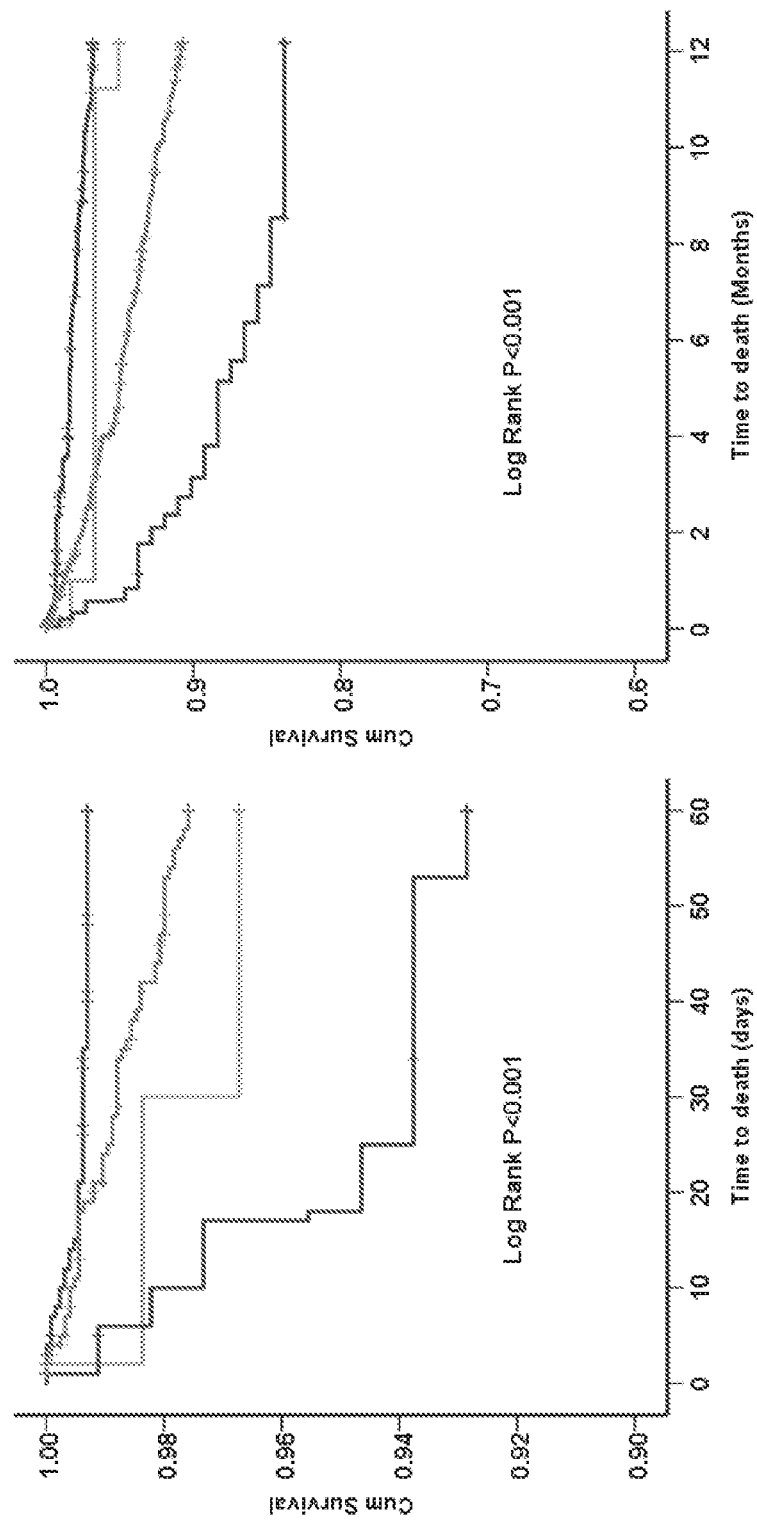
FIG. 9 shows Kaplan-Meier curves for the primary end point of 60 day mortality and long term mortality stratified by CIN and suPAR.
Figure 10:
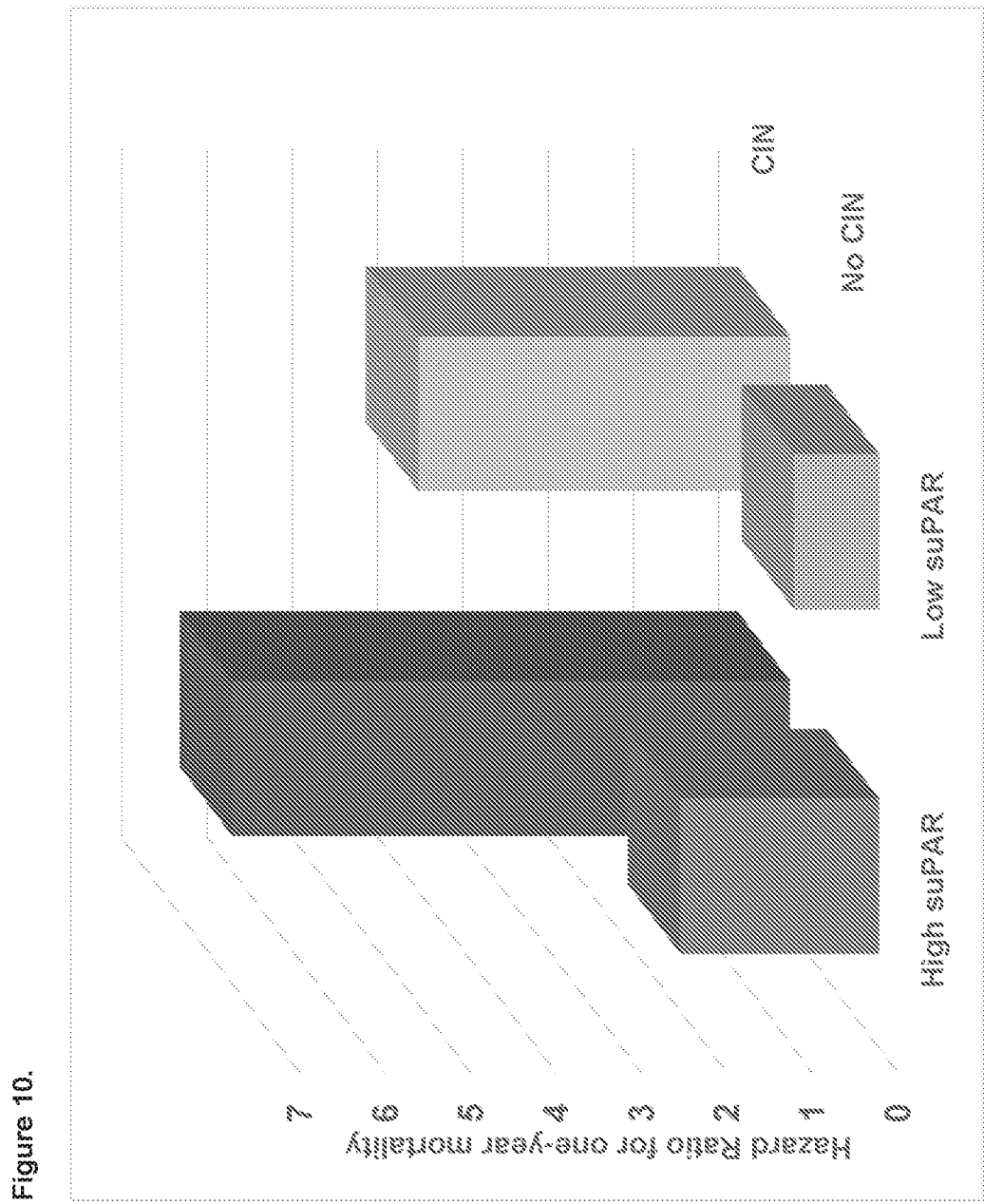
FIG. 10 illustrates the hazard ratio for one-year mortality.

Mortality rate at 60 days (data available for 97% of the total cohort) was higher in those who developed CIN (10 death, 5.7%) compared to those without CIN (39 deaths, 1.5%) with HR of 3.9 (95% CI 1.9-7.7, P<0.001). Similarly, 1-year mortality rate (data available for 95% of the total cohort) was higher in those who developed CIN (21 deaths, 12.1%) compared to those without CIN (153 deaths, 5.9%) with HR=2.1 (95% CI 1.3-3.3, P=0.001). Kaplan-Meier survival analyses for association between CIN and 60-day and 1-year mortality in those with and without CIN are shown in FIG. 8. After adjusting for age, sex, smoking history, body mass index, heart failure history, acute myocardial infarction, diabetes, hypertension, hyperlipidemia, obstructive CAD >50%, and baseline GFR, both CIN (HR=2.9, 95% CI 1.4-5.8, P=0.004) and higher suPAR levels (log 2 HR=2.9, 95% CI 1.9-4.5, P<0.001) were independently predictive of worse outcomes. Similarly, both CIN (HR=1.6, 95% CI 1.02-2.6, P=0.04) and suPAR levels (log 2 HR=2.4, 95% CI 1.8-3.0, P<0.001) were independently predictive of 1-year mortality. Those who developed CIN and had high suPAR levels about median had worse 60-day mortality (HR=6.5, 95% CI 2.3-17.8, P<0.001) and 1-year mortality (HR=3.6, 95% CI 2.0-6.4, P<0.001) compared to patients without CIN and low suPAR levels (below median), FIGS. 9 and 10.

In those who developed CIN, 49 patients died (28%) over median of 3.5 years. Independent predictors of death included white race (HR=3.5, 95% CI 1.4-9.1, P=0.009), history of heart failure (HR=2.7, 95% CI 1.5-5.0, P=0.002), and suPAR (log 2 HR=2.9, 95% CI 1.7-4.9, P<0.001). In those with without CKD at baseline who developed CIN and available follow-up renal function (n=46), 18 patients (39%) developed CKD over median follow-up of 4.8 years. SuPAR was predictive of incident CKD defined as GFR<60 (log 2 HR=3.5, 95% CI 1.2-10.1, P=0.02) independent of baseline GFR (HR=1.4, 95% CI 1.01-1.9, P=0.045).

DISCUSSION

This is the first study to demonstrate that elevated plasma SuPAR levels are associated with CIN in prospective cohort of patients undergoing cardiac angiography. In this high-risk patient group, the association between suPAR and CIN is independent of traditional risk factors and biomarkers including hsCRP and contrast volume. SuPAR significantly improved discrimination of CIN diagnosis over a standard clinical model derived from National Cardiovascular Data Registry, as evidenced by improvement in the C-statistic. We also found a significant association between severity of CIN and suPAR levels. Additionally, higher suPAR levels are associated with worse clinical outcomes in those with CIN including development of CKD and death.

CIN is thought to occur as a result acute tubular necrosis. The exact mechanism by which ATN occurs is not clear. Two hypothesis proposed include (1) contrast-mediated vasoconstriction resulting in hypoxia or (2) direct contrast-mediated renal toxicity that may be in turn mediated by alteration in renal hemodynamics including alteration in the levels of nitric oxide or prostaglandins[69-71] Despite knowledge of numerous risk factors for the development of CIN, including diabetes mellitus, heart failure, worse renal function, anemia, hemodynamic instability, models utilizing clinical characteristics to predicting CIN have demonstrated only moderate success. For example, the Mehran risk score had c-statistic of 0.67[56]. Similarly, the National Cardiovascular Data Registry which included more than 1 million patients with a c-Statistic in the validation cohort of 0.713.[36] There have also been several efforts to combine clinical risk factors and biomarkers to improve CIN prediction. Several biomarkers have been studied in attempt to predict the incidence and severity CIN and its associated outcomes including Cystatin C and Neutrophil Gelatinase-Associated Lipocalin (NGAL).[59, 61-63, 72-76]. Cystatin C and NGAL levels have however been better shown to be early markers of CIN after contrast administration rather than a pre-contrast screening biomarkers.[77, 78]. While these markers may be promising, they still lack the characteristics of strong biomarkers readily available that is reliable with a high predictive value.

The link between suPAR levels to contrast induced nephropathy is likely linked to inflammation but the exact clinicopathological mechanism is yet to be elucidated. SuPAR levels have been implicated in a handful of renal pathologies including development of new chronic kidney disease independent of traditional risk factors[13]. SuPAR levels have also been associated with renal function in patients with sepsis, and implicated in the pathology of focal segmental glomerulosclerosis[79, 15, 16]. Of interest, SuPAR has recently also been shown to be independently and significantly associated with the incidence of acute kidney injury after cardiac surgery[44] SuPAR acts on podocytes by activating $\alpha v\beta 3$ integrins that promotes podocyte injury as shown in mice models[7, 16]. As a marker of immune inflammation, suPAR levels likely reflects upstream pathological processes implicated in oxidative and inflammatory pathways that might be a predisposition to contrast induced nephropathy.

Our study revealed a robust association between elevated suPAR levels and both the incidence and severity of CIN. The role of inflammatory biomarkers in CIN has been previously studied. For example, as mentioned above, both interleukin-18 and NGAL are higher in patients with CIN but their role in predicting outcomes is even weaker and unclear as the studies are smaller and invalidated 65,78,80, 81 In our large cohort of patients undergoing coronary angiogram, we demonstrated the value of suPAR in predicting both incident and severity of CIN in addition to mortality which may further help guide patient care. It is still to be determined whether therapies targeted at reducing suPAR levels would improve clinical outcomes in high risk patients.

CONCLUSIONS

This is the first and largest comprehensive study to demonstrate that levels of SuPAR are significantly higher in patients who developed CIN and higher levels were associated with worse CIN and clinical outcomes. The predictive value of suPAR is additive to clinical risk factors and may therefore help better identify patients at risk for developing CIN.

The disclosure may employ, unless indicated specifically to the contrary, methods of chemistry, biochemistry, organic chemistry, molecular biology, microbiology, recombinant DNA techniques, genetics, immunology, and cell biology that are within the skill of the art, many of which are described below for the purpose of illustration. Such techniques are explained fully in the literature. See, e.g., Sambrook, et al., *Molecular Cloning: A Laboratory Manual* (3rd Edition, 2001); Maniatis et al., *Molecular Cloning: A Laboratory Manual* (1982); Ausubel et al., *Current Protocols in Molecular Biology* (John Wiley and Sons, updated July 2008); *Short Protocols in Molecular Biology: A Compendium of Methods from Current Protocols in Molecular Biology*, Greene Pub. Associates and Wiley-Interscience; Glover, *DNA Cloning: A Practical Approach*, vol. I & II (IRL Press, Oxford, 1985); Anand, *Techniques for the Analysis of Complex Genomes*, (Academic Press, New York, 1992); *Transcription and Translation* (B. Hames & S. Higgins, Eds., 1984); Perbal, *A Practical Guide to Molecular Cloning* (1984); Harlow and Lane, *Antibodies*, (Cold Spring Harbor Laboratory Press, Cold Spring Harbor, N.Y., 1998) *Current Protocols in Immunology* Q. E. Coligan, A. M. Kruisbeek, D. H. Margulies, E. M. Shevach and W. Strober, eds., 1991); *Annual Review of Immunology*; as well as monographs in journals such as *Advances in Immunology*.

REFERENCES

1. Li P K, Burdmann E A, Mehta R L, Joint International Society of N, International Federation of Kidney Foundations World Kidney Day Steering C. Acute kidney injury: Acute kidney injury—global health alert. Nat Rev Nephrol 2013; 9:133-5.
2. Rewa O, Bagshaw S M. Acute kidney injury-epidemiology, outcomes and economics. Nat Rev Nephrol 2014; 10:193-207.

3. Lameire N H, Bagga A, Cruz D, et al. Acute kidney injury: an increasing global concern. Lancet 2013; 382:170-9.
4. Pakula A M, Skinner R A. Acute Kidney Injury in the Critically Ill Patient: A Current Review of the Literature. J Intensive Care Med 2016; 31:319-24.
5. McCullough P A, Choi J P, Feghali G A, et al. Contrast-Induced Acute Kidney Injury. J Am Coll Cardiol 2016; 68:1465-73.
6. Wang Y, Bellomo R. Cardiac surgery-associated acute kidney injury: risk factors, pathophysiology and treatment. Nat Rev Nephrol 2017; 13:697-711.
7. Hayek S S, Koh K H, Grams M E, et al. A tripartite complex of suPAR, APOL1 risk variants and alphavbeta3 integrin on podocytes mediates chronic kidney disease. Nat Med 2017; 23:945-53.
8. Tran M T, Zsengeller Z K, Berg A H, et al. PGC1alpha drives NAD biosynthesis linking oxidative metabolism to renal protection. Nature 2016; 531:528-32.
9. Rabb H, Griffin M D, McKay D B, et al. Inflammation in AKI: Current Understanding, Key Questions, and Knowledge Gaps. J Am Soc Nephrol 2016; 27:371-9.
10. Leth J M, Leth-Espensen K Z, Kristensen K K, et al. Evolution and Medical Significance of LU Domain-Containing Proteins. Int J Mol Sci 2019; 20.
11. Thuno M, Macho B, Eugen-Olsen J. suPAR: the molecular crystal ball. Disease markers 2009; 27:157-72.
12. Wei C, Li J, Adair B D, et al. uPAR isoform 2 forms a dimer and induces severe kidney disease in mice. J Clin Invest 2019.
13. Hayek S S, Sever S, Ko Y A, et al. Soluble Urokinase Receptor and Chronic Kidney Disease. N Engl J Med 2015; 373:1916-25.
14. Wei C, Trachtman H, Li J, et al. Circulating suPAR in two cohorts of primary FSGS. J Am Soc Nephrol 2012; 23:2051-9.
15. Wei C, E I Hindi S, Li J, et al. Circulating urokinase receptor as a cause of focal segmental glomerulosclerosis. Nat Med 2011; 17:952-60.
16. Wei C, Moller C C, Altintas M M, et al. Modification of kidney barrier function by the urokinase receptor. Nat Med 2008; 14:55-63.
17. Hahm E, Wei C, Fernandez I, et al. Bone marrow-derived immature myeloid cells are a main source of circulating suPAR contributing to proteinuric kidney disease. Nat Med 2017; 23:100-6.
18. Huai Q, Mazar A P, Kuo A, et al. Structure of human urokinase plasminogen activator in complex with its receptor. Science 2006; 311:656-9.
19. Maile L A, Busby W H, Gollahon K A, et al. Blocking ligand occupancy of the alphaVbeta3 integrin inhibits the development of nephropathy in diabetic pigs. Endocrinology 2014; 155:4665-75.
20. Hayek S S, Ko Y A, Awad M, et al. Cardiovascular Disease Biomarkers and suPAR in Predicting Decline in Renal Function: A Prospective Cohort Study. Kidney Int Rep 2017; 2:425-32.
21. Luo S, Coresh J, Tin A, et al. Soluble Urokinase-Type Plasminogen Activator Receptor in Black Americans with CKD. Clinical journal of the American Society of Nephrology: CJASN 2018; 13:1013-21.
22. Schaefer F, Trachtman H, Wuhl E, et al. Association of Serum Soluble Urokinase Receptor Levels With Progression of Kidney Disease in Children. JAMA Pediatr 2017; 171 e172914.
23. Schulz C A, Persson M, Christensson A, et al. Soluble Urokinase-type Plasminogen Activator Receptor (suPAR) and Impaired Kidney Function in the Population-based Malmo Diet and Cancer Study. Kidney Int Rep 2017; 2:239-47.
24. Hayek S S, Landsittel D P, Wei C, et al. Soluble Urokinase Plasminogen Activator Receptor and Decline in Kidney Function in Autosomal Dominant Polycystic Kidney Disease. J Am Soc Nephrol 2019; 30:1305-13.
25. Gaggin H K, Bhardwaj A, Belcher A M, et al. Design, methods, baseline characteristics and interim results of the Catheter Sampled Blood Archive in Cardiovascular Diseases (CASABLANCA) study. IJC Metabolic & Endocrine 2014; 5:11-8.
26. Ko Y A, Hayek S, Sandesara P, Samman Tahhan A, Quyyumi A. Cohort profile: the Emory Cardiovascular Biobank (EmCAB). BMJ Open 2017; 7:e018753.
27. Weisbord S D, Gallagher M, Jneid H, et al. Outcomes after Angiography with Sodium Bicarbonate and Acetylcysteine. N Engl J Med 2018; 378:603-14.
28. Levey A S, Stevens L A, Schmid C H, et al. A new equation to estimate glomerular filtration rate. Ann Intern Med 2009; 150:604-12.
29. Khwaja A. KDIGO clinical practice guidelines for acute kidney injury. Nephron Clin Pract 2012; 120:c179-84.
30. Riisbro R, Christensen I J, Hogdall C, Brunner N, Hogdall E. Soluble urokinase plasminogen activator receptor measurements: influence of sample handling. Int J Biol Markers 2001; 16:233-9.
31. Lau A, Chung H, Komada T, et al. Renal immune surveillance and dipeptidase-1 contribute to contrast-induced acute kidney injury. J Clin Invest 2018; 128:2894-913.
32. Kiss N, Hamar P. Histopathological Evaluation of Contrast-Induced Acute Kidney Injury Rodent Models. Biomed Res Int 2016; 2016:3763250.
33. Thurman J M, Lucia M S, Ljubanovic D, Holers V M. Acute tubular necrosis is characterized by activation of the alternative pathway of complement. Kidney Int 2005; 67:524-30.
34. Kauffman M E, Kauffman M K, Traore K, et al. MitoSOX-Based Flow Cytometry for Detecting Mitochondrial ROS. React Oxyg Species (Apex) 2016; 2:361-70.
35. Mookerjee S A, Nicholls D G, Brand M D. Determining Maximum Glycolytic Capacity Using Extracellular Flux Measurements. PLoS One 2016; 11:e0152016.
36. Tsai T T, Patel U D, Chang T I, et al. Contemporary incidence, predictors, and outcomes of acute kidney injury in patients undergoing percutaneous coronary interventions: insights from the NCDR Cath-PCI registry. JACC Cardiovasc Interv 2014; 7:1-9.
37. Ympa Y P, Sakr Y, Reinhart K, Vincent J L. Has mortality from acute renal failure decreased?A systematic review of the literature. The American journal of medicine 2005; 1118:827-32.
38. Solomon R, Werner C, Mann D, D'Elia J, Silva P. Effects of saline, mannitol, and furosemide on acute decreases in renal function induced by radiocontrast agents. N Engl J Med 1994; 331:1416-20.
39. O'Neal J B, Shaw A D, Billings FTt. Acute kidney injury following cardiac surgery: current understanding and future directions. Crit Care 2016; 20:187.
40. Jacob K A, Leaf D E, Dieleman J M, et al. Intraoperative High-Dose Dexamethasone and Severe AKI after Cardiac Surgery. J Am Soc Nephrol 2015; 26:2947-51.

41. Garg A X, Devereaux P J, Yusuf S, et al. Kidney function after off-pump or on-pump coronary artery bypass graft surgery: a randomized clinical trial. JAMA 2014; 311: 2191-8.
42. Tavakoli R, Lebreton G. Biomarkers for early detection of cardiac surgery-associated acute kidney injury. J Thorac Dis 2018; 10:S3914-S8.
43. Pozzoli S, Simonini M, Manunta P. Predicting acute kidney injury: current status and future challenges. J Nephrol 2018; 31:209-23.
44. Mossanen J C, Pracht J, Jansen T U, et al. Elevated Soluble Urokinase Plasminogen Activator Receptor and Proenkephalin Serum Levels Predict the Development of Acute Kidney Injury after Cardiac Surgery. Int J Mol Sci 2017; 18.
45. Rear R, Bell R M, Hausenloy D J. Contrast-induced nephropathy following angiography and cardiac interventions. Heart 2016; 102:638-48.
46. Dal Monte M, Cammalleri M, Pecci V, et al. Inhibiting the urokinase-type plasminogen activator receptor system recovers STZ-induced diabetic nephropathy. J Cell Mol Med 2019; 23:1034-49.
47. Han R, Hu S, Qin W, et al. C3a and suPAR drive versican V1 expression in tubular cells of focal segmental glomerulosclerosis. JCI Insight 2019; 4.
48. Jannot A S, Burgun A, Thervet E and Pallet N. The Diagnosis-Wide Landscape of Hospital-Acquired AKI. Clin J Am Soc Nephrol. 2017; 12:874-884.
49. Hou S H, Bushinsky D A, Wish J B, Cohen J J and Harrington J T. Hospital-acquired renal insufficiency: a prospective study. Am J Med. 1983; 74:243-8.
50. Mitchell A M, Jones A E, Tumlin J A and Kline J A. Incidence of contrast-induced nephropathy after contrast-enhanced computed tomography in the outpatient setting. Clin J Am Soc Nephrol. 2010; 5:4-9.
51. Karlsberg R P, Dohad S Y, Sheng R and Iodixanol Peripheral CTASIP. Contrast-induced acute kidney injury (CI-AKI) following intra-arterial administration of iodinated contrast media. J Nephrol. 2010; 23:658-66.
52. Wilhelm-Leen E, Montez-Rath M E and Chertow G. Estimating the Risk of Radiocontrast-Associated Nephropathy. J Am Soc Nephrol. 2017; 28:653-659.
53. Rudnick M R, Goldfarb S, Wexler L, Ludbrook P A, Murphy M J, Halpern E F, Hill J A, Winniford M, Cohen M B and VanFossen D B. Nephrotoxicity of ionic and nonionic contrast media in 1196 patients: a randomized trial. The Iohexol Cooperative Study. Kidney Int. 1995; 47:254-61.
54. Rihal C S, Textor S C, Grill D E, Berger P B, Ting H H, Best P J, Singh M, Bell M R, Barsness G W, Mathew V, Garratt K N and Holmes D R, Jr. Incidence and prognostic importance of acute renal failure after percutaneous coronary intervention. Circulation. 2002; 105:2259-64.
55. Lautin E M, Freeman N J, Schoenfeld A H, Bakal C W, Haramati N, Friedman A C, Lautin J L, Braha S, Kadish E G, Sprayregen S and et al. Radiocontrast-associated renal dysfunction: incidence and risk factors. AJR Am J Roentgenol. 1991; 157:49-58.
56. Mehran R, Aymong E D, Nikolsky E, Lasic Z, Iakovou I, Fahy M, Mintz G S, Lansky A J, Moses J W, Stone G W, Leon M B and Dangas G. A simple risk score for prediction of contrast-induced nephropathy after percutaneous coronary intervention: development and initial validation. J Am Coll Cardiol. 2004; 44:1393-9.
57. Gruberg L, Mintz G S, Mehran R, Gangas G, Lansky A J, Kent K M, Pichard A D, Satler L F and Leon M B. The prognostic implications of further renal function deterioration within 48 h of interventional coronary procedures in patients with pre-existent chronic renal insufficiency. J Am Coll Cardiol. 2000; 36:1542-8.
58. Mueller C, Buerkle G, Buettner H J, Petersen J, Perruchoud A P, Eriksson U, Marsch S and Roskamm H. Prevention of contrast media-associated nephropathy: randomized comparison of 2 hydration regimens in 1620 patients undergoing coronary angioplasty. Arch Intern Med. 2002; 162:329-36.
59. Cecchi E, Avveduto G, D'Alfonso M G, Terreni A, Gelera E, Caldini A and Giglioli C. Cystatin C, but not urinary or serum NGAL, may be associated with contrast induced nephropathy after percutaneous coronary invasive procedures: A single center experience on a limited number of patients. Acta Med Acad. 2017; 46:34-43.
60. Li S, Tang X, Peng L, Luo Y, Zhao Y, Chen L, Dong R, Zhu J, Chen Y and Liu J. A head-to-head comparison of homocysteine and cystatin C as pre-procedure predictors for contrast-induced nephropathy in patients undergoing coronary computed tomography angiography. Clin Chim Acta. 2015; 444:86-91.
61. Ebru A E, Kilic A, Korkmaz F S, Seker R, Sasmaz H, Demirtas S and Biyikli Z. Is cystatin-C superior to creatinine in the early diagnosis of contrast-induced nephropathy?: a potential new biomarker for an old complication. J Postgrad Med. 2014; 60:135-40.
62. Padhy M, Kaushik S, Girish M P, Mohapatra S, Shah S and Koner B C. Serum neutrophil gelatinase associated lipocalin (NGAL) and cystatin C as early predictors of contrast-induced acute kidney injury in patients undergoing percutaneous coronary intervention. Clin Chim Acta. 2014; 435:48-52.
63. Alharazy S M, Kong N, Saidin R, Gafor A H, Maskon O, Mohd M and Zakaria S Z. Serum neutrophil gelatinase-associated lipocalin and cystatin C are early biomarkers of contrast-induced nephropathy after coronary angiography in patients with chronic kidney disease. Angiology. 2014; 65:436-42.
64. Bachorzewska-Gajewska H, Poniatowski B and Dobrzycki S. NGAL (neutrophil gelatinase-associated lipocalin) and L-FABP after percutaneous coronary interventions due to unstable angina in patients with normal serum creatinine. Adv Med Sci. 2009; 54:221-4.
65. Ling W, Zhaohui N, Ben H, Leyi G, Jianping L, Huili D and Jiaqi Q. Urinary IL-18 and NGAL as early predictive biomarkers in contrast-induced nephropathy after coronary angiography. Nephron Clin Pract. 2008; 108:c176-81.
66. Bachorzewska-Gajewska H, Malyszko J, Sitniewska E, Malyszko J S, Pawlak K, Mysliwiec M, Lawnicki S, Szmitkowski M and Dobrzycki S. Could neutrophil-gelatinase-associated lipocalin and cystatin C predict the development of contrast-induced nephropathy after percutaneous coronary interventions in patients with stable angina and normal serum creatinine values?Kidney Blood Press Res. 2007; 30:408-15.
67. Eapen D J, Manocha P, Patel R S, Hammadah M, Veledar E, Wassel C, Nanjundappa R A, Sikora S, Malayter D, Wilson P W, Sperling L, Quyyumi A A and Epstein S E. Aggregate risk score based on markers of inflammation, cell stress, and coagulation is an independent predictor of adverse cardiovascular outcomes. J Am Coll Cardiol. 2013; 62:329-37.
68. Jeppesen J, Hansen T W, Olsen M H, Rasmussen S, Ibsen H, Torp-Pedersen C, Hildebrandt P R and Madsbad S. C-reactive protein, insulin resistance and risk of car- 69. Persson P B, Hansell P and Liss P. Pathophysiology of contrast medium-induced nephropathy. *Kidney Int.* 2005; 68:14-22.
70. Heyman S N, Rosenberger C and Rosen S. Regional alterations in renal haemodynamics and oxygenation: a role in contrast medium-induced nephropathy. *Nephrol Dial Transplant.* 2005; 20 Suppl 1:i6-11.
71. Agmon Y, Peleg H, Greenfeld Z, Rosen S and Brezis M. Nitric oxide and prostanoids protect the renal outer medulla from radiocontrast toxicity in the rat. *J Clin Invest.* 1994; 94:1069-75.
72. Al-Beladi F I. Cystatin C is an early marker of contrast-induced nephropathy in patients with sepsis in the intensive care unit. *Saudi J Kidney Dis Transpl.* 2015; 26:718-24.
73. Kim G S, Ko Y G, Shin D H, Kim J S, Kim B K, Choi D, Hong M K and Jang Y. Elevated serum cystatin C level is an independent predictor of contrast-induced nephropathy and adverse outcomes in patients with peripheral artery disease undergoing endovascular therapy. *J Vasc Surg.* 2015; 61:1223-30.
74. Xu S Y, Carlson M, Engstrom A, Garcia R, Peterson C G and Venge P. Purification and characterization of a human neutrophil lipocalin (HNL) from the secondary granules of human neutrophils. *Scand J Clin Lab Invest.* 1994; 54:365-76.
75. Mori K, Lee H T, Rapoport D, Drexler I R, Foster K, Yang J, Schmidt-Ott K M, Chen X, Li J Y, Weiss S, Mishra J, Cheema F H, Markowitz G, Suganami T, Sawai K, Mukoyama M, Kunis C, D'Agati V, Devarajan P and Barasch J. Endocytic delivery of lipocalin-siderophore-iron complex rescues the kidney from ischemia-reperfusion injury. *J Clin Invest.* 2005; 115:610-21.
76. Mishra J, Ma Q, Prada A, Mitsnefes M, Zahedi K, Yang J, Barasch J and Devarajan P. Identification of neutrophil gelatinase-associated lipocalin as a novel early urinary biomarker for ischemic renal injury. *J Am Soc Nephrol.* 2003; 14:2534-43.
77. Muratoglu M, Kavalci C, Kilicli E, Findik M, Kayipmaz A E and Durukan P. Serum Neutrophil Gelatinase-Associated Lipocalin Levels In Early Detection Of Contrast-Induced Nephropathy. *Clin Invest Med.* 2016; 39:E88-94.
78. Wang K, Duan C Y, Wu J, Liu Y, Bei W J, Chen J Y, He P C, Liu Y H and Tan N. Predictive Value of Neutrophil Gelatinase-Associated Lipocalin for Contrast-Induced Acute Kidney Injury After Cardiac Catheterization: A Meta-analysis. *Can J Cardiol.* 2016; 32:1033 e19-29.
79. Koch A, Voigt S, Kruschinski C, Sanson E, Duckers H, Horn A, Yagmur E, Zimmermann H, Trautwein C and Tacke F. Circulating soluble urokinase plasminogen activator receptor is stably elevated during the first week of treatment in the intensive care unit and predicts mortality in critically ill patients. *Crit Care.* 2011; 15:R63.
80. Lichosik M, Jung A, Jobs K, Mierzejewska A, Zdanowski R and Kalicki B. Interleukin 18 and neutrophil-gelatinase associated lipocalin in assessment of the risk of contrast-induced nephropathy in children. *Cent Eur J Immunol.* 2015; 40:447-53.
81. Tong J, Li H, Zhang H, Luo Z, Huang Y, Huang J, He F and Fu J. Neutrophil Gelatinase-associated Lipocalin in the Prediction of Contrast-induced Nephropathy: A Systemic Review and Meta-analysis. *J Cardiovasc Pharmacol.* 2015; 66:239-45.
82. Koller L, Stojkovic S, Richter B, Sulzgruber P, Potolidis C, Liebhart F, Mortl D, Berger R, Goliasch G, Wojta J, Hulsmann M and Niessner A. Soluble Urokinase-Type Plasminogen Activator Receptor Improves Risk Prediction in Patients With Chronic Heart Failure. *JACC Heart Fail.* 2017; 5:268-277.
83. Chen J S, Chang L C, Wu C Z, Tseng T L, Lin J A, Lin Y F and Cheng C W. Significance of the urokinase-type plasminogen activator and its receptor in the progression of focal segmental glomerulosclerosis in clinical and mouse models. *J Biomed Sci.* 2016; 23:24.
84. Asciutto G, Edsfeldt A, Dias N V, Nilsson J, Prehn C, Adamski J and Goncalves I. Treatment with beta-blockers is associated with lower levels of Lp-PLA2 and suPAR in carotid plaques. *Cardiovasc Pathol.* 2013; 22:438-43.

The invention claimed is:

1. A method of treating or reducing the incidence or severity of acute kidney injury induced by a contrast agent in a human patient, the method comprising:
   measuring or having measured a level of soluble urokinase plasminogen activator receptor (suPAR) in a biological sample from the human patient exposed to a contrast agent;
   determining or having determined the level of suPAR in the sample is a suPAR level of about 3 ng/ml or greater; and
   administering a therapeutically effective amount of an anti-suPAR antibody or antigen-binding fragment thereof that specifically binds to suPAR to the human patient thereby reducing the incidence or severity of acute kidney injury induced by the contrast agent.

2. The method according to claim 1, wherein the human patient is undergoing a medical procedure.

3. The method according to claim 2, wherein the level of suPAR in the biological sample from the human patient is measured before the medical procedure.

4. The method according to claim 2, wherein the human patient is undergoing a cardiovascular intervention.

5. The method according to claim 1, wherein the agent is administered before a medical procedure.

6. The method according to claim 1, wherein the anti-suPAR antibody or antigen-binding fragment thereof that specifically binds to suPAR is humanized.

7. The method according to claim 1, wherein the level of suPAR is measured by an Enzyme-Linked Immunosorbent Assay (ELISA).

8. The method of claim 1, wherein the contrast agent is an iodinated contrast agent.

9. The method of claim 1, wherein the contrast agent is a barium compound.

* * * * *